US006462301B1

(12) United States Patent
Scott et al.

(10) Patent No.: US 6,462,301 B1
(45) Date of Patent: Oct. 8, 2002

(54) HEAVY-DUTY PLATE LASER WITH LINEAR MOTORS FOR X AND Y POSITION CONTROL

(75) Inventors: William B. Scott, Rochelle, IL (US); Ira E. Cole, III, Rockford, IL (US)

(73) Assignee: W. A. Whitney Co., Rockford, IL (US)

( * ) Notice: Subject to any disclaimer, the term of this patent is extended or adjusted under 35 U.S.C. 154(b) by 56 days.

(21) Appl. No.: 09/660,980

(22) Filed: Sep. 13, 2000

Related U.S. Application Data

(63) Continuation-in-part of application No. 09/396,954, filed on Sep. 15, 1999, now Pat. No. 6,392,192.

(51) Int. Cl.[7] .............................................. B23K 26/00
(52) U.S. Cl. ................................ 219/121.67; 219/121.6
(58) Field of Search .......................... 219/121.67, 121.6

(56) References Cited

U.S. PATENT DOCUMENTS

| | | | | |
|---|---|---|---|---|
| 3,692,292 A | * | 9/1972 | Rokop et al. ............. 266/23 K |
| 4,434,349 A | * | 2/1984 | Tsutsumi ............... 219/121 LG |
| 5,061,839 A | | 10/1991 | Matsuno et al. ........ 219/121.83 |
| 5,118,918 A | | 6/1992 | Serrano ................. 219/121.78 |
| 5,136,136 A | | 8/1992 | Karube et al. ......... 219/121.73 |
| 5,237,151 A | * | 8/1993 | Maruyama ............. 219/121.78 |
| 5,239,160 A | | 8/1993 | Sakura et al. .......... 219/121.82 |
| 5,298,716 A | | 3/1994 | Ogawa et al. ......... 219/121.67 |
| 5,374,803 A | | 12/1994 | Yamada ................. 219/121.72 |
| 5,399,835 A | | 3/1995 | Nakata .................. 219/121.78 |
| 5,442,436 A | * | 8/1995 | Lawson ....................... 356/153 |
| 5,444,211 A | | 8/1995 | Nakata et al. ......... 219/121.67 |
| 5,493,095 A | | 2/1996 | Bruschi et al. ........ 219/121.75 |
| 5,607,606 A | | 3/1997 | Mori et al. ............ 219/121.67 |
| 5,637,243 A | * | 6/1997 | Sato et al. ............. 219/121.67 |
| 5,667,707 A | * | 9/1997 | Klingel et al. ......... 219/121.67 |
| 5,670,064 A | | 9/1997 | Nakata .................... 219/121.6 |
| 5,756,961 A | * | 5/1998 | Sato et al. ............. 219/121.67 |
| 5,777,807 A | | 7/1998 | Bar et al. .................... 359/845 |
| 5,854,460 A | * | 12/1998 | Graf et al. ............. 219/121.67 |
| 5,889,256 A | | 3/1999 | Osanai .................. 219/121.74 |
| 5,898,522 A | | 4/1999 | Herpst ........................ 359/511 |
| 6,128,138 A | * | 10/2000 | Cole, III ...................... 359/641 |

FOREIGN PATENT DOCUMENTS

| | | | |
|---|---|---|---|
| GB | 2327277 A | 1/1999 | |
| JP | 4167990 A | * 6/1992 | ............ B23K/6/04 |

OTHER PUBLICATIONS

Optimizing Cutting and Welding Processing by Controlling the Laser Beam, D. Christopher Hermanns, presented in Lasers in the Workpiece Session at Manufacturing '96 Conference.

Transient Behaviour of Optical Components and their Correction by Adaptive Optical Elements, M. Bea, S. Borik, A. Giesen, U. Zoske.

*Primary Examiner*—M. Alexandra Elve
(74) *Attorney, Agent, or Firm*—Leydig, Voit & Mayer, Ltd.

(57) ABSTRACT

A heavy-duty laser plate cutting machine capable of cutting heavy plate but which can also operate on lighter sheet metal at commercial production rates. The machine includes a laser source having an output power of 3 kilowatts or more. The machine is preferably of the flying optic configuration, and an automatic beam control system is interposed between the laser source and a focusing optic carried in the cutting head. The cutting head, in addition to normal z axis control, has an adjustment to position the focal spot relative to the workpiece. The focal spot can be driven into the workpiece when cutting heavy plate. The cutting head is configured to carry focusing optics having different focal lengths, such as those suitable for thick plate and thin sheet. The x and y axes include linear motors to precisely traverse the bridge and cutting head along the axes at speeds suitable for heavy plate, and at higher speeds suitable for thinner sheet. Provision is also made for easily aligning or squaring the bridge to the x axis.

19 Claims, 13 Drawing Sheets

OTHER PUBLICATIONS

Bestform Laser Lenses, Special Optics Magazine.
High Power $CO_2$ Laser Beam Collimator, II–VI Incorporated Brochure.
Laser Machining, Inc. Data Sheet.
Solutions Oriented Beam Delivery from LMI Advertising in Industrial Laser Review.
Lasers, Anthony E. Siegman, University Science Books.
Achieving Consistent Results in Laser Cutting Thick Plate, Published in the Fabricator May 1996, Dennis Ebner.
Laser Cutting Heavy Plate Published in Industrial Laser Review, Aug. 1995, Stephen Hicks and Norine Weiss.
Beam Expander–Condensers, II–VI Incorporated.
Trumatic HSL 2502 Advertisement from www.trumpf.com Website.

* cited by examiner

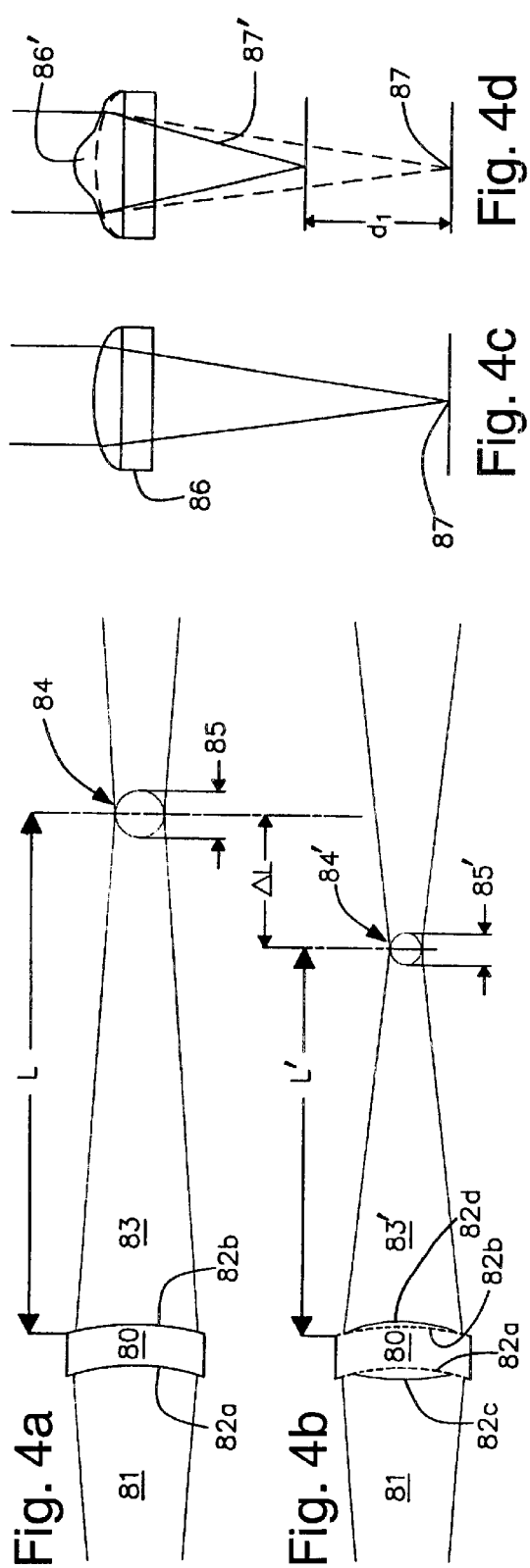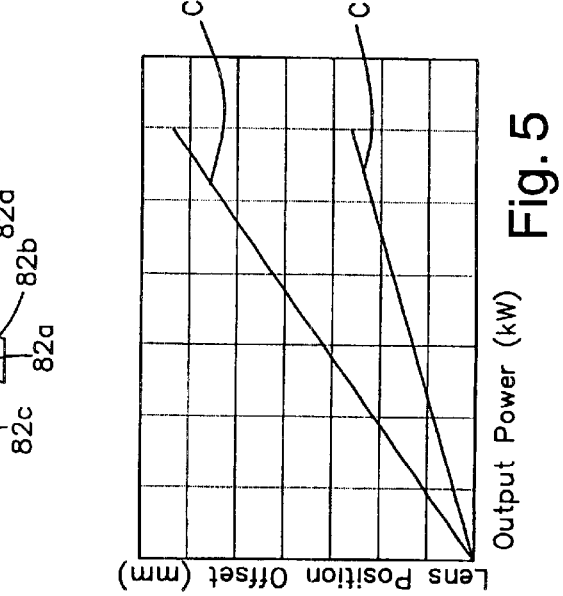
Fig. 4a, Fig. 4b, Fig. 4c, Fig. 4d, Fig. 5, Fig. 6

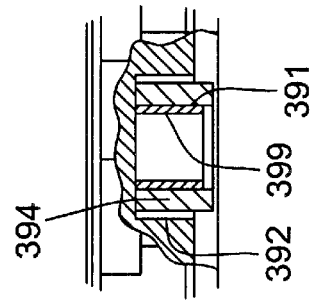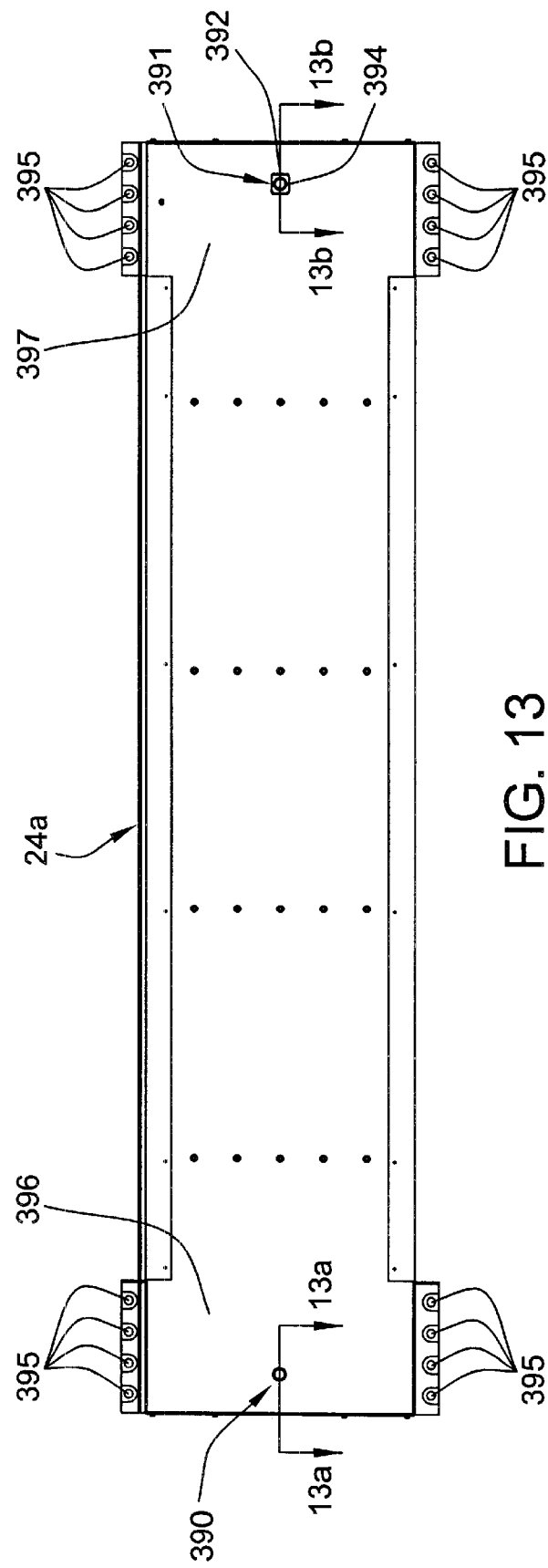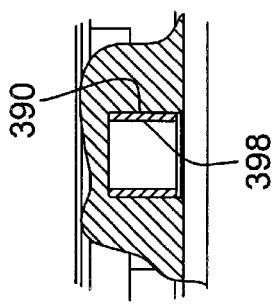

HEAVY-DUTY PLATE LASER WITH LINEAR MOTORS FOR X AND Y POSITION CONTROL

RELATED APPLICATIONS

This application is a continuation-in-part of U.S. application Ser. No. 09/396,954, filed Sep. 15, 1999 now U.S. Pat. No. 6,392,192, the teachings and disclosure of which are hereby incorporated in their entirety by reference thereto.

FIELD OF THE INVENTION

The present invention relates to laser-equipped machine tools, and more particularly to a heavy-duty laser plate cutting machine.

BACKGROUND AND SUMMARY OF THE INVENTION

In the following paragraphs, background information, and information summarizing the invention will be presented together so as to convey a coherent view of the significance of the invention.

Laser-equipped machine tools are often used to cut parts from sheet metal and plate. In such machine tools a laser beam, concentrated by a focusing lens or mirror to a small diameter spot, is directed to position the focal point above, on or below the surface of the material to be cut. The laser beam is directed by the focusing optic through a nozzle disposed immediately above the workpiece, with a pressurized gas being directed through the nozzle, typically coaxially with the laser beam, to assist making the cut. The pressurized gas interacts with the laser beam and material, facilitating the cutting process, and creates a high velocity stream that carries the melted material away from the cut.

Laser-equipped machine tools are usually Computer Numerically Controlled, and are manufactured in many configurations and sizes and with lasers of various types and power. The present invention relates to heavy-duty plate lasers, such as those which are capable of cutting steel plate on the order of one-inch thick or more at production cutting rates on the order of 24 inches per minute (ipm). The present invention is directed to a machine having those capabilities and sufficient adaptability to also efficiently handle lighter materials, such as sheet metal. In the most preferred embodiment, a "flying optic" configuration is utilized. In that configuration the cutting head is adapted for movement along one axis, such as the Y-axis which is mounted on a bridge adapted for movement along an orthogonal, X-axis. The work is supported on a stationary pallet or table below the bridge. Movement of the cutting head is coordinated with movement of the bridge to define a precise path on the part. The cutting head and laser are controlled to pierce, cut and form holes and shapes in the material, and then to cut the part from the material.

In a laser cutting machine, the laser beam is produced in a laser generator and is directed along a beam path via a beam delivery system. A beam delivery system is a collection of optical elements, such as reflective mirrors and transmissive optics, which may redirect the beam, alter the propagation characteristics of the beam or focus the beam. The beam delivery system is enclosed for safety and for control of the beam path environment within. The laser beam is concentrated by a focusing lens or mirror to a small diameter spot, which is directed to an appropriate position relative to the surface of the material to be processed.

In most implementations, the laser beam exits the laser through an output coupler, a partially transmissive and partially reflective optical element which seals the laser cavity and transmits a portion of the beam out of the laser cavity or resonator. The beam is then directed along a beam path to a focusing optic in a processing head near the work. In most cutting applications, the beam is directed by the focusing optic through a nozzle disposed immediately above the workpiece to be cut. A pressurized gas is also directed through the nozzle, typically coaxial to the beam, to assist the cutting process. The pressurized gas serves to facilitate and/or shield the cutting process, and creates a gas stream which helps remove vaporized and molten material from the cut or kerf. Kerf refers to the zone of material which is acted upon and removed by a cutting process. Kerf width refers to the width of the slot created by the cutting process, such as the width of the slot cut by a laser beam as it moves along a path.

Key factors in laser processing include the diameter of the focus spot and the position of the focus spot relative to the material to be processed. The control of these focal characteristics is critical to maintaining the quality of the process. During processing, unintended deviation in the focus spot size and position may produce a deterioration in process quality and may even cause the process to fail.

The first of two main factors which influence the focus characteristics is the diameter of the laser beam at the focal optic. Due to diffraction, the minimum focal spot diameter, for a given focal length optic, is limited. Diffraction causes light beams to diverge or spread transversely as they propagate. As the input laser beam diameter increases for a given focal optic, the focus spot diameter decreases due to a decrease in diffraction. In addition, as the input laser beam diameter increases for a given focal optic, the focus spot position shifts closer to the focus optic.

The raw laser beam, issuing from the laser resonator, exhibits the characteristic of divergence. The beam diameter will change as a function of the distance from the output coupler. Typically, as the processing head moves over the processing area the distance from the output coupler to the focal optic will change. When a large processing area is required, some method of maintaining the proper beam diameter must be employed in order to avoid significant changes in focus diameter and position.

Additionally, changes in the output power level of the laser will affect the divergence of the output beam. The largest effect on beam divergence comes from the thermal loading of the output coupler which produces thermal lensing. Thermal lensing is distortion of an optical component caused by heat absorbed from the input beam. The absorbed portion of the beam causes expansion of the output coupler such that the curvature of the surface changes. The expansion causes a change in the divergence of the output beam thereby changing the beam size at any given distance from the output coupler. The rate and amount of distortion is dependent upon the power of the beam, optic contamination, thermal conductivity of the optic and its cooling system and the length of time the beam is applied. Upon reaching thermal equilibrium, when absorbed heat is in balance with that removed by the lens cooling system, the shape of the optic surface remains constant. When the beam is turned off, the optic surface gradually relaxes and returns to its original shape. When a high output power laser is required, some method of maintaining the proper beam diameter, in a time dependent response to output power changes, must be employed if significant changes in focus diameter and position are to be avoided.

The second of two main factors which influence the focus characteristics is the distortion of the focus optic due to heat absorption. In a manner similar to that described for the laser output coupler, thermal lensing occurs in the focus optic. The expansion of the focus optic reduces the effective radius of curvature which causes the focal spot to shift closer to the focus optic. When a high output power laser is required, some method of maintaining the proper focal position, in a time dependent response to input laser power changes, must be employed if significant changes in focus position are to be avoided.

Proper focal position is very important in cutting heavy plate. In initiation of a cut, the plate must be pierced, and a preferable piercing technique requires "driving" the beam through the plate. This can be accomplished by altering the position of the focal spot, by actually moving it into the plate as the piercing operation progresses. Furthermore, in cutting different types of materials, it is often useful to alter the focal spot position with respect to the surface of relatively thick materials so as to optimize the quality of the cut.

Turning now to the divergence issue mentioned above, one method employed to reduce the divergence of the laser beam is to expand or magnify it with a collimator. The rate of divergence of a beam is reduced in inverse proportion to the amount it is magnified. If a beam is magnified by 125 percent its rate of divergence is reduced 20 percent. If it is magnified by 200 percent its rate of divergence is reduced by 50 percent.

Collimators are optical devices, also known as beam expanders and condensers. Such devices also have other characteristics and functions known to those skilled in the art. Manufacturers of laser optics publish literature providing information on design variations and examples of use. One example of such literature is the II–IV Incorporated publication, Beam Expander-Condensers, published 3/92. Collimators can be constructed of transmissive optics such that the beam is passed through the optics. Such collimators are commonly used in laser-equipped machines up to about three kilowatt power levels and sometimes above.

Collimators used on low powered lasers are designed or adjusted to magnify the beam a given amount, and then locked in place. Use of transmissive collimators with lasers having power levels above three kilowatts becomes increasingly problematic due to thermal lensing and due to limits on the energy density that transmissive optic materials can withstand. Impurities within optical materials, crystal growth conditions, surface contamination and surface imperfections are primary causes for a portion of a laser beam to be absorbed and converted to heat within a transmissive optical element.

The distortion produced by thermal lensing can influence the divergence and mode quality of the beam passing through or reflecting off of the optical delivery and focusing components and thereby cause detrimental shifts of focus position. Thermal lensing is a greater problem with transmissive optics. For example, when a high power beam is directed at the curved surface of a plano-convex focal lens, which has a curved first surface and a flat second surface, the absorbed portion of the beam causes expansion of the lens such that the curvature of the surface changes. The expansion reduces the effective radius of curvature which causes the focal spot to shift upward or closer to the lens. The rate of curvature change is greater toward the center of the lens due to the power distribution of the incident laser beam. Therefore, the heating and the expansion is greater toward the center of the lens. Fixed collimators constructed of transmissive optics are very susceptible to thermal lensing which reduces their effectiveness for use with high power lasers.

Collimators are also constructed of reflective optics, combinations of flat and shaped mirrors, such that the light beam is reflected from the optical elements. Reflective optical elements are typically manufactured from materials, such as copper, which can withstand greater energy densities without damage. Also, thermal lensing is not as severe in reflective optics as compared to transmissive optics. Thus reflective collimators are more suitably used in high power laser applications. However, a fixed, reflective collimator cannot compensate for the thermal lensing of a laser output coupler nor for the thermal lensing of a focal optic.

Certain numerically controlled laser cutting machines have been configured to cut heavy plate and others have been configured to cut lighter sheet metal. While both types of machines use a laser, and use some mechanism for traversing the laser with respect to the workpiece, the two different applications (heavy plate versus light sheet) cause the machines to be configured with significant differences. For example, a machine configured for cutting heavy plate must, of course, have a high power laser. The beam path and optical system in such machines must be suitable for the application. Typically longer focal length lenses are used to cut thick material. The mechanism for traversing the cutting head over the workpiece usually employs conventional rotary servo motors with ball screws or rack and pinion drives. These tried and true drive mechanisms have speed capabilities which are more than adequate for the slow cutting rates (generally 100 inches per minute or less) which characterize the cutting of thick plate. In addition, piercing of the workpiece is usually a more significant problem with heavy duty machines.

A typical arrangement for a laser plate cutting machine is disclosed in Maruyama U. S. Pat. No. 5,237,151. In that configuration the laser is carried on the machine structure and travels with the machine. Such machines are successful in cutting very large thick plates. However, such machines carry heavy moving loads which reduces their acceleration and deceleration capabilities. Therefore, these machines lack the nimbleness required for cutting thin materials at high velocities. Moreover, material handling on such machines tends to be cumbersome in that the material is loaded over and between the two rails which carry the machine.

A typical requirement for machines which cut lighter duty material such as sheet stock is for high production which usually means high cutting speeds and fast traverse rates. The sheet stock is thinner so the power of the laser need not be very high. With lower power lasers the optics systems are often less complex. Shorter focal length lenses are used in the cutting head, such that the lens is closer to the cutting nozzle. In the context of lighter duty machines it has been suggested to utilize linear motors for enhancing the cutting speed and accuracy. Linear motors provide travel at speeds up to 6000 ipm and are direct drive systems resulting in very accurate positioning. Linear motors, however, bring their own set of problems. Large magnetic attraction forces exist between the linear motor and its magnet track. Machine ways and structure must be capable of carrying this load while precisely maintaining a small gap between the motor and magnets. At the same time, very precise alignment is required between the pairs of linear motors driving the bridge, which can be difficult given the machine's structural requirements of strength and rigidity to support the linear motors.

Heretofore efforts to produce a universal machine capable of cutting both thin and thick material have not been particularly successful, insofar as the current inventors are aware. A light duty machine "beefed up" to cut heavier stock will usually not be successful. A machine configured for heavy duty, thick material cutting will have inadequate nimbleness to cut thin material quickly and economically.

To provide a versatile machine tool adaptable for cutting both thick plate as well as thinner sheet, the present invention provides a heavy-duty laser plate cutting machine that, in conjunction with other features, provides for the use of focal optics with different focal lengths and employs linear motors for the main traversing mechanisms. Linear motors are used to traverse the bridge along the X-axis and the cutting head along the Y-axis. For sheet metal or other thin materials which can be cut at higher speeds, linear motors provide high acceleration rates, high velocity and accurate positioning. For thick plate, linear motors provide highly accurate positioning at lower speeds and rapid acceleration, travel and deceleration when traversing between cuts. The relatively light weight bridge structure allows high cutting speeds and rapid traverse speeds, and in conjunction with the ability to change the focal optics, provides a heavy-duty laser plate cutting machine adaptable for cutting heavy plate and light sheet at commercially acceptable production rates.

The focal length of the optic contributes to the diameter of the focal spot and thus the energy density, Watts per unit area, at the focal spot. Shorter focal length optics create smaller focal spots having higher energy densities. The focal length of the optic also contributes to depth of focus of the focal spot with longer focal lengths having greater depth of focus. Shorter focal length optics are advantageous for cutting thinner materials while longer focal length optics are advantageous for cutting thicker material. To provide for the use of focal optics with different focal lengths, an optic with one focal length can be used for cutting thick plate, and another with a different focal length can be used for cutting thinner materials. The ability to change focal lengths is an important feature in a heavy-duty plate machine adapted to also cut lighter materials. When the machine is not being operated for thick plate, a new focusing optic may be inserted and the machine can cut thinner materials at high speeds, minimizing the downtime of the machine.

Preferably, an automatic and real time control system maintains the size of the laser beam on the focusing lens and compensates for thermal lensing of the laser output coupler and of the focusing lens. The machine is preferably of a "flying optic" construction with a separated material loading station outside of the cutting area, the material being loaded on pallets which are moved into the cutting area for processing, makes loading and unloading material much easier. The material carrying pallets are readily accessible for manual loading and unloading and are easily adapted for automated material handling systems.

In view of the foregoing, it is a general aim of the present invention to provide a heavy duty laser cutting machine which is specially configured for economical cutting of medium and lighter duty materials at reasonably high production rates.

An objective of the present invention is to provide a laser equipped cutting machine having a combination of features and functions adapted to cutting a relatively thick plate at production rates, with sufficient versatility to function on thinner materials at commercially acceptable cutting rates.

A further object of the present invention is to provide a laser equipped cutting machine that is easily adjusted prior to running the machine to prevent binding due to misalignment.

In accomplishing the foregoing objectives, the present invention combines a number of features in a unique and novel way. The heavy duty cutting is facilitated by utilizing a high power laser, generally 3 kilowatts and above. The optical system is provided with real time compensation for thermal changes in the output coupler and focusing optics occasioned by the high power of the laser beam. The cutting head is provided with the ability to switch focal lengths, so that the same cutting head can be provided with different focal length optics depending on the nature of the material being cut. Finally the machine is provided with linear motors for the main traversing mechanisms (at the least the X and Y mechanisms). In cutting heavy stock, the linear motors provide increased accuracy and rapid acceleration, deceleration, and traverse between cuts. In cutting lighter duty material, cutting speed can be substantially increased without sacrificing accuracy. Additionally, the linear motors are accommodated in the machine of the present invention in a way which simplifies alignment while maintaining a rigidified structure.

Other objects and advantages of the invention will become more apparent from the following detailed description when taken in conjunction with the accompanying drawings.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIGS. 4a–4d are diagrams illustrating the phenomenon of thermal lensing;

FIG. 5 is a diagram illustrating focal position offset as a function of steady state output power for two typical focusing lenses;

FIG. 6 is a diagram illustrating the rate at which a lens will absorb energy from an incident laser beam at different power levels, and thus change in size and 5 transmissive characteristics;

FIG. 10b is an end view of FIG. 10a.

FIG. 13 is a bottom view of the base of the bridge of FIG. 11.

FIGS. 13a and 13b are partial cross-sectional views of the bridge base of FIG. 13 taken along the lines 13a–13a and 13b–13b.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
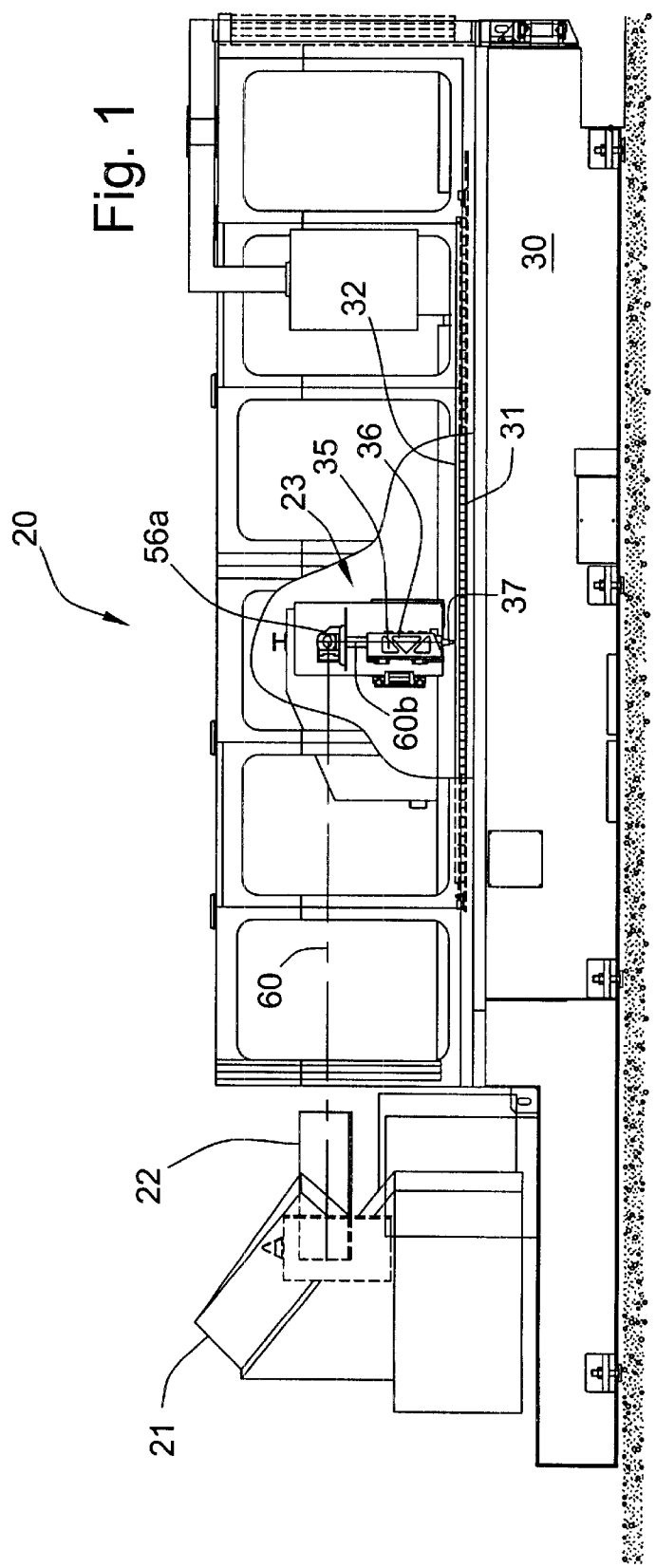
FIG. 1 is a front elevation, partly simplified and partly broken away, showing a laser-equipped machine tool in which the present invention can be embodied.
Figure 2:
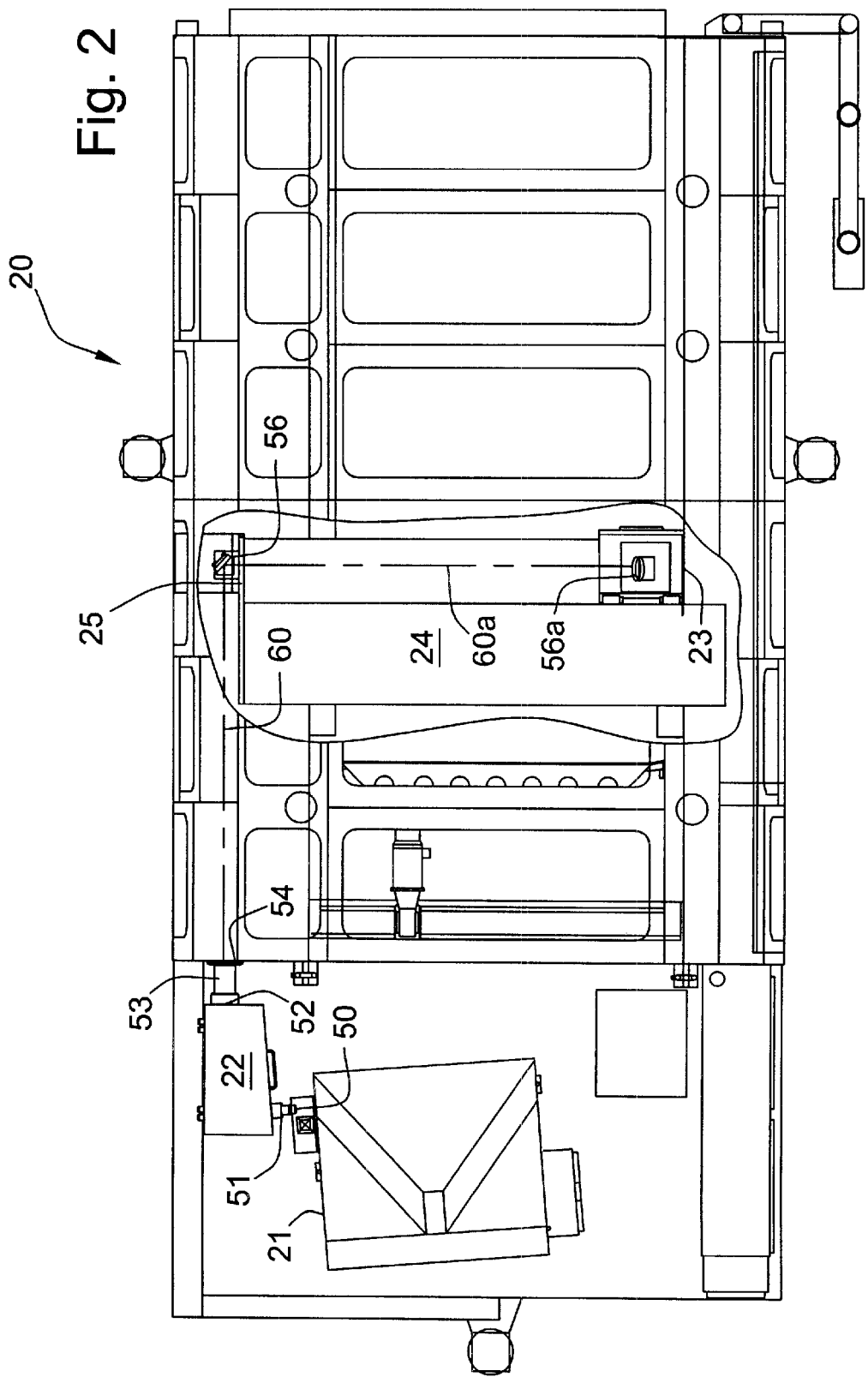
FIG. 2 is a plan view of the machine of FIG. 1.

Turning now to the drawings, FIGS. 1 and 2 illustrate a laser-equipped cutting machine capable of cutting heavy plate in accordance with the invention. In the illustrated embodiment, a laser cutting machine tool 20 typically includes a collimator 22 interposed between a laser source 21 and a cutting head indicated generally at 23. Briefly, laser cutting machine 20 consists of a base 30 which supports a worktable 31 on which rests a workpiece 32. The laser source 21 will not be described in any detail except to note that in this case it is a high power device producing a beam having power of 3 kilowatts or more, preferably 4 kilowatts and most preferably in the order of 6 kilowatts or more.

Laser source 21 delivers a high power laser beam to collimator 22 which directs a collimated beam 60 to first bending mirror 56, then to second bending mirror 56a mounted above cutting head 23, and then to a focusing optic mounted in a lens holder 36. The laser beam is directed from focusing optic through nozzle 37 disposed immediately above the workpiece. Pressurized gas is also directed through nozzle 37, coaxially to the laser beam, to assist the cutting process. The pressurized gas serves to facilitate and/or shield the cutting process, and creates a gas stream which helps remove vaporized and molten material from the cut.

Cutting head 23 is adapted for movement along one axis, here called the Y-axis which is mounted to bridge 24. Bridge 24 is adapted for movement along an orthogonal X-axis. The workpiece or plate 32 is supported on a pallet or table 31 below bridge 24. Movement of cutting head 23 is coordinated with movement of bridge 24 to define a precise path on plate 32. Laser 21 and cutting head 23 are controlled to pierce and cut holes and shapes and then the boundary of a part from the plate 32. The X and Y axes include linear motors to provide versatile locomotion to the bridge 24 and cutting head 23 for cutting heavy plate as well as lighter or thinner material, as will be describe in more detail herein.

Figure 3:
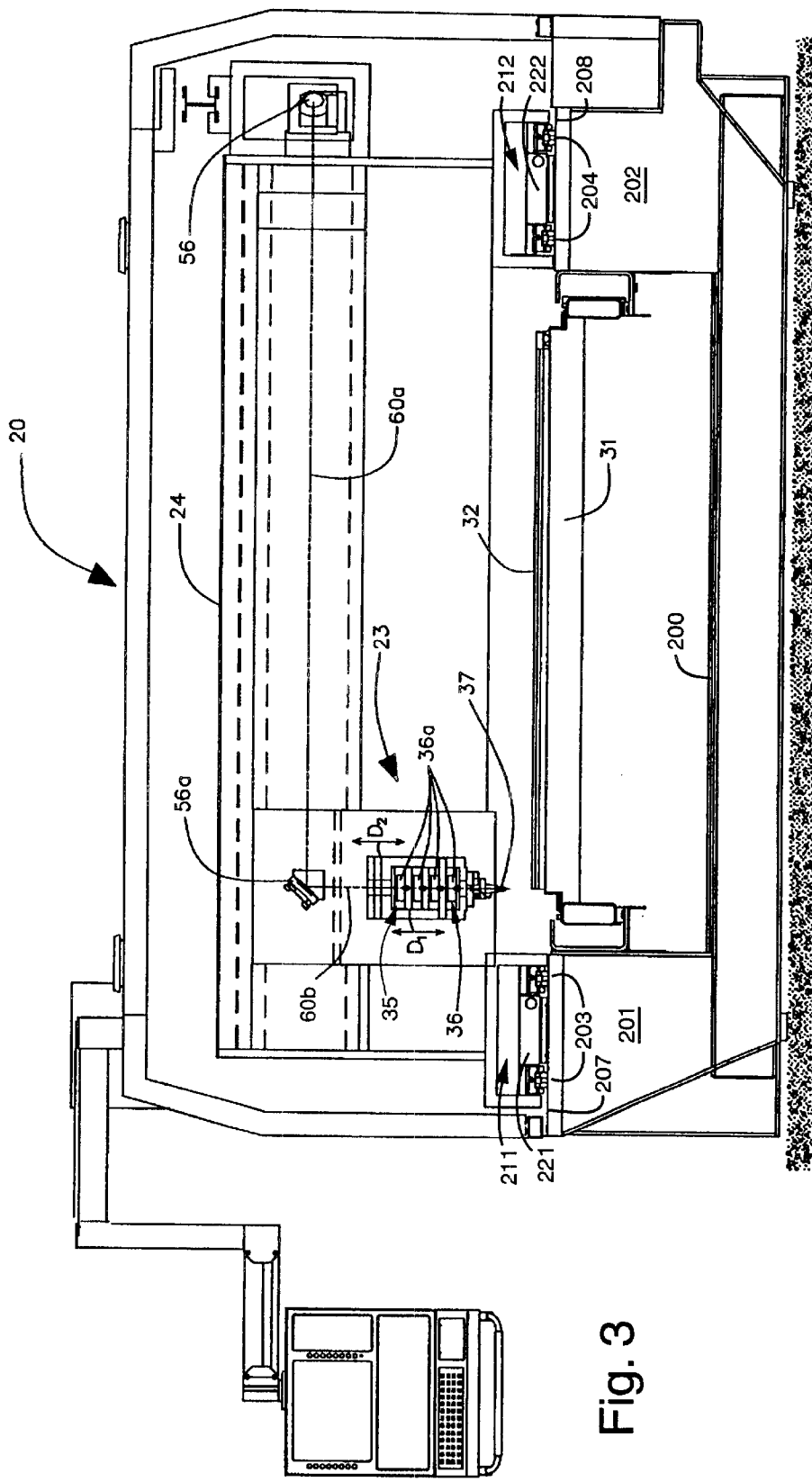
FIG. 3 is an end elevation of the machine of FIG. 1.

Cutting head 23 traverses the full length of the worktable 31 (left to right as shown in FIG. 2) and the full width of the worktable 31 (top to bottom as shown in FIG. 2 or left to right as shown in FIG. 3). Those boundaries define the cutting area and the maximum size workpiece 32 that the machine can process. With this machine configuration the length of the laser beam path between the laser output coupler and the focusing optic in cutting head 23 changes as the cutting head 23 moves over the cutting area.

As best shown in FIG; 2, beam 60 is directed from collimator 22 to bending mirror 56 which is attached to the end of bridge 24 by way of panel 25. Mirror 56 moves with bridge 24 such that the distance between collimator 22 and mirror 56 is variable and dependent on the position of bridge 24 within its length of travel.

As best shown in FIGS. 2 and 3, beam 60a is beam 60 reflected from mirror 56 to mirror 56a mounted above cutting head 23. Mirror 56a moves with cutting head 23 such that the distance between mirror 56 and mirror 56a and thus the length of beam path 60a is variable and dependent on the position of cutting head 23 within its length of travel.

As best shown in FIG. 3, beam 60b is beam 60a reflected from mirror 56a through a lens (not shown) carried in lens holder 36 and then through nozzle 37 to the workpiece 32. Cutting head 23 is shown in a retracted position above the work. Nozzle 37 would typically be positioned within a few mm above the surface of the work 32 when cutting. The length of beam 60b is variable and dependent upon the thickness of material 32 processed, the position of the focal optic within its length of travel and the vertical position of cutting head 23 within its length of travel.

In summary, the length of the beam path between the laser output coupler and the workpiece is variable in a flying optic cutting machine. The range of variation of the path length is dependent upon the length of travel along the X, Y, and Z axes. In practical terms, the amount of variation in this Z-axis is insignificant and can be ignored. However in some configurations the amount of variation in the Z-axis is significant and should be compensated. In the configuration shown, the beam path is shortest when cutting head 23 is positioned to the extreme left end of the work support 31, see FIG. 1, and to the extreme right side of the work support 31, see FIG. 3, and when cutting thick material. It is longest when cutting head 23 is positioned to the extreme right end of the work support 31, see FIG. 1, and to the extreme left side of the work support 31, see FIG. 3, and when cutting thin material. In the exemplary machine, the difference in beam path length between those two extremes is a little over 6 meters.

Collimator 22, part of an automatic beam control system, provides means to vary the divergence of laser beam 60 at the collimator output, and thus to control the size of the beam at the focusing optic in the cutting head. Broadly, the automatic beam control system and the collimator can be considered to assist the focusing optic in the cutting head to focus the beam. Preferably, it does so by maintaining a controlled and consistent spot size projected onto the focusing optic. However, it can also be controlled to vary the spot size to produce desired effects on the beam projected onto the workpiece. The collimator is preferably motorized by means of a servo motor or other precision prime mover, and positioned under CNC control to correct and compensate for changing beam characteristics.

Path length changes of the order noted can have a marked impact on the size of the beam incident on the focusing optic and correspondingly on the shape and position of the focused beam aimed at the workpiece. Observable changes will be noted in the quality of the cut and size of the part as the cutting head is traversed across its range of travel.

In accordance with one aspect of the present invention, a control system operates a beam control device, in the illustrated embodiment the collimator 22, to control beam divergence in such a way as to maintain a desired beam size at the focusing optic. In the simplest case, the beam size at the focusing optic is controlled to maintain a constant size. However, there are cases where the system can introduce controlled variations in beam size to compensate for other system variables. Unless the context indicates otherwise, the term "controlled beam size" is intended to encompass both alternatives. In its most preferred form the present invention is utilized with a reflective collimator so as to be able to operate in what is considered a high power range, generally three to four kilowatts and above. Transmissive collimators or other transmissive beam correction devices are preferably avoided in high power applications because of the additional thermal lensing and beam distortion problems they introduce when operated at high power levels. A preferred form of collimator 22 is described and claimed in a commonly owned application in the name of Ira E. Cole III, Ser. No. 09/353,936, filed Jul. 15, 1999, the disclosure of which is hereby incorporated by reference. Other continuously adjustable collimators can also be used in the practice of the present invention. U.S. Pat. No. 5,442,436 shows an adjustable collimator having four reflective optical elements. Such a collimator, with the addition of a servo motor adapted to drive its adjustment mechanism, could also be used in the practice of the present invention.

A controllable drive system, such as a servo motor and drive, is required to operate a continuously adjustable collimator and thereby correct for beam divergence changes. Other forms of controllable drive systems such as stepper motors, servo controlled linear motors, or servo controlled fluid driven cylinders could be used. Such systems are characterized by the ability to precisely position a driven device such as a collimator. Such servo systems usually include some form of position feedback. Adaptive optics, which alter the curvature of a mirror, may be employed to the same purpose as the collimator.

In addition to path length caused changes of beam characteristics, thermal lensing causes another change. Thermal lensing is the distortion of an optical component caused by heat absorbed from the input beam. Absorbed heat distorts the optic causing a change in focus characteristics. The rate and amount of distortion is dependent upon the power of the beam, thermal conductivity of the optic and its cooling system and the length of time the beam is on or off. Upon reaching thermal equilibrium, when the absorbed heat is in balance with that removed by the lens cooling system, the shape of the optic surface remains constant. When the beam is turned off, the optic relaxes and returns to its original shape.

Thermal lensing is more pronounced in transmissive optics such as a laser output coupler or a focal lens. FIGS. 4a–4d illustrate thermal lensing. FIG. 4a illustrates a laser output coupler 80 which partially reflects and partially transmits beam 81. As is typical, the inner surface 82 and outer surface 82a are contoured such that transmitted beam 83 has a narrower waist 84 positioned "L" distance from the output coupler and having a diameter 85. FIG. 4b illustrates the effects of thermal lensing. The output coupler expands as heat is absorbed. The original optical surfaces 82a and 82b, shown in dotted lines, are distorted, as shown in solid lines and in an exaggerated fashion as 82c and 82d, thus causing a change in characteristics of output beam 83'. The beam waist 84' is made smaller and shifts ΔL in position.

The change in beam propagation characteristics of an optic operating at various power levels can be determined by test and is substantially repeatable. From test data, it is possible to derive an equation to predict the magnitude of the beam waist shift and divergence change as a function of integrated time and power. As will be described in greater detail below, the present invention provides the ability to combine such information with beam path length information to position a collimator to compensate for and thus correct changes in beam characteristics such that intended characteristics are maintained.

Focal optics are also subject to thermal lensing. FIG. 4c shows a plano-convex focal lens 86 having focal spot 87. FIG. 4d shows optic 86' distorted in exaggerated fashion to illustrate thermal lensing and shows a shifted focal spot 87'. Distance d, between focal spots 87 and 87' represents the shift in focus caused by thermal lensing in exaggerated fashion. In high power devices this shift can be substantial. For example a plano-convex zinc selenide 10 inch focal length lens subjected to a 6 kilowatt beam 35 mm in diameter was determined to have a focus shift exceeding 6 mm. In the present invention, thermal lensing of the focal optic is compensated separately from thermal lensing of the output coupler and is accomplished by adding a correction signal to the drive system which positions the focal optic.

FIG. 3 shows the cutting head 23 with nozzle 37 positioned over the workpiece 32. The Z-axis driving mechanism is schematically illustrated and identified as $D_2$. That drive moves the cutting head in the vertical, Z-axis direction, and positions the nozzle at a predetermined distance above workpiece 32 for cutting. A second drive, identified schematically as $D_f$, translates the lens carrier 35 within cutting head 23. The lens carrier drive, as it is sometimes referred to herein, adjusts the position of the focal spot relative to the surface of workpiece 32 without changing the position of the nozzle with respect to the same surface. It is used to position the focus spot correctly for piercing and cutting various materials. In some cases the lens is driven downwardly during part of the piercing cycle. In all cases the position of the focal spot has a predetermined desired position. However, thermal lensing will cause an undesirable shift in focal spot position. In practicing certain aspects of the invention, drive $D_1$ is provided with a Z-axis position command and a Δz position offset which corrects for a shift in position of the focus spot caused by thermal lensing.

FIG. 5 illustrates, for two different optics, the amount of focal point shift as a function of power incident on the optic. Curve A represents the focal spot shift produced by various power levels from zero through six kilowatts. Curve B represents the same information for a different focal length optic. The invention compensates for such shifts by introducing corrective action.

Compensating for thermal lensing is not a simple steady state problem as suggested in FIG. 5. A lens can be considered a thermal integrator, which stores and releases heat with the rate of change dependent upon the power of the beam, the effectiveness of the cooling system, and duration which the beam is applied. The resulting changes in focus characteristics occur at a rate which can be described by an exponential curve. Typically a laser output coupler will have a time constant on the order of 6 seconds after turn-on before sixty-three percent of the full thermal effect is realized. In FIG. 6 exponential curves $P_1$, $P_2$ and $P_3$ graph the rate of change of beam characteristics based on different average power levels applied to an output coupler. $P_1$ is the lowest power level and $P_3$ is the highest.

Figure 7:
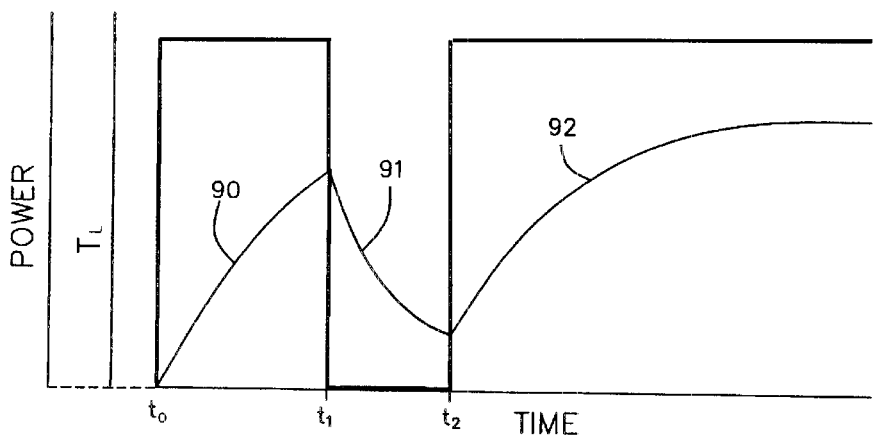
FIG. 7 is a diagram illustrating the thermal loading of a lens, showing the signals applied to the laser and relative distortion in the lens.

Also it must be considered that the laser will not be continuously on, but will be switched on and off for fairly brief intervals. When the laser is switched off, the lens will cool at a rate also describable by an exponential curve. In summary, the amount of thermal distortion of an output coupler or other optic is a variable, dependent upon the power on the optic with the rate of change describable by an exponential function having a time constant matching that of the optic system and dependent on the time which has lapsed after the beam is turned on or off. FIG. 7 shows a power versus time plot for a typical optic, such as the output coupler of a high power laser. Curve segment 90 extending from $t_0$ to $t_1$ shows the rate of thermal buildup in the optic after power is initially applied. At time $t_1$ the laser is switched off. Curve 91 shows the exponential cooling rate of the optic until it reaches $t_2$ at which point the laser is turned on again. Curve 92 shows the rate of thermal buildup from $t_2$. The curve of FIG. 7 can be considered an integrated power time representation of the amount of thermal energy stored in an optic. Such information is used in the practice of the present invention to determine compensation values to correct for thermally caused changes in beam characteristics.

In order to compensate for changes in the optical system, a signal is utilized indicative of the integrated energy level stored in an output coupler, operating between its two steady state energy points of off and fully saturated. In real time, the amount of thermal energy stored in the optic is tracked and determined. That information is used to determine a correction value. The correction value is introduced in real time to a drive system to adjust a beam control optic to correct focal characteristics of the beam. In systems, such as the exemplary one, in which the beam path length changes, the amount of thermal energy stored in the output coupler and the length of the beam path are used in combination and in real time to determine the compensation value. In machine tools having a fixed beam path length only the thermal energy stored in the output coupler would be used to determine the compensation value.

Figure 8:
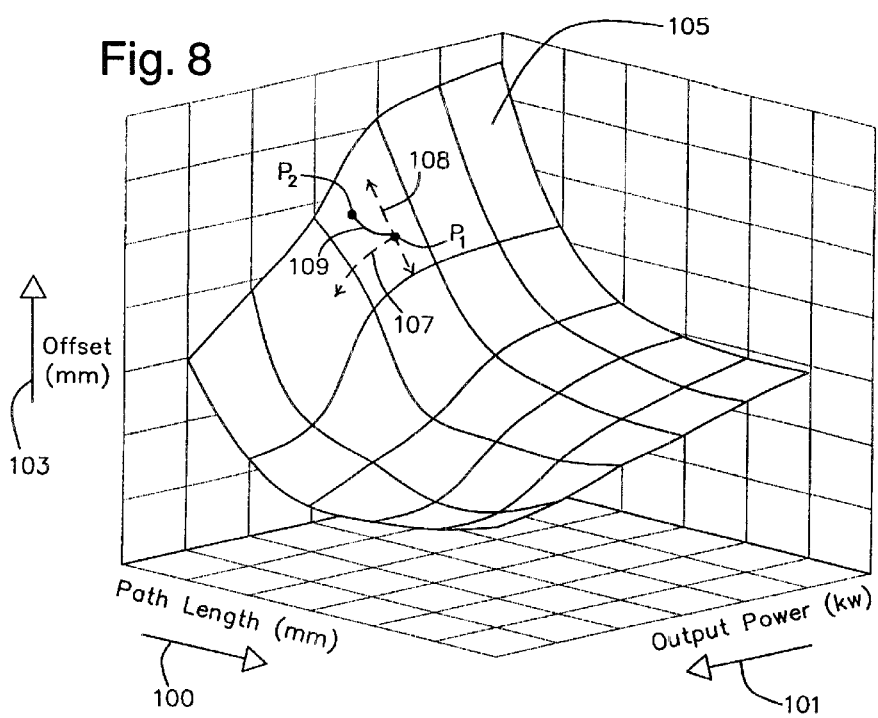
FIG. 8 is a diagram illustrating an example of a three dimensional correction curve as used in the practice of the present invention.

In a currently preferred practice of the invention, a reflective collimator is interposed between the laser and the focusing optic, and has an adjustment mechanism operated to compensate for both thermal lensing changes and path length changes. The nature of the changes can be conceptualized as introducing a correction based on a three-dimensional curve, a form of which is illustrated in FIG. 8. Turning to FIG. 8, a three axis grid is shown in which a first axis 100 defines path length changes from a fixed reference, such as zero, at the ordinate to the maximum path length change. Thus, the cutting head in the shortest path length position, corresponds to a point on the axis 100 at the ordinate, and movement of the cutting head in directions which increase the path length move the point in the direction of the arrow 100.

Integrated output power in units such as kilowatts, is plotted along the axis 101. The minimum power point is at or near the ordinate, and increasing power levels are displaced from the ordinate in the direction defined by arrow 101. The output power plotted along this axis is the integrated output power at any given point in time, such as is shown in FIG. 7.

The third axis in the three-dimensional plot is the offset for the collimator. The offset in one example has a zero position at the ordinate and increasing positive deviation indicated by the arrow 103. The scale can also be arranged with zero offset at an intermediate position providing both positive and negative offsets on respective sides of the zero point.

FIG. 8 has a three-dimensional surface 105 plotted thereon which is the relationship between output power, path length, and collimator offset for a particular machine tool. Thus, it is known that for any given amount of integrated energy in the optic and for any given path length in the machine, the collimator will need to be adjusted by the appropriate offset defined by the surface 105 in order to maintain the beam waist (FIGS. 4a and 4b) at the appropriate size and position, in order to keep the size of the laser beam incident on the focusing optic at the desired diameter. As will be clear from FIG. 7 the integrated output power in the lens will change over time based on whether the laser is on or off, and thus the input along the axis 101 will be continuously changing as the laser beam is triggered. Similarly, the path length will be changing as the cutting head is traversed to cut a particular part, causing the path length along the axis 100 to be continuously changing. As a result, the three-dimensional relationship identified by the surface 105 will cause the resulting offset to be continuously changing, and the offset will be coupled to a servo or other prime mover in the collimator to continuously and in real time adjust the collimator to maintain the beam size on the focusing optic at the desired size.

Consider for example that at a given instant in time the operating conditions for the system are defined by a point $P_1$ on the surface 105. That demands a given offset as determined by the three-dimensional relationship. As the laser remains on, however, thermal loading will increase and the operating point will begin to move in the direction indicated by the arrow 107. Similarly, as the cutting head is traversed the operating point $P_1$ will move in one direction or the other as indicated by the double headed arrow 108. The result may, for example, be a movement of the point from $P_1$ to $P_2$ along the path 109. That requires a continuous change in offset which is communicated to the collimator in order to maintain the desired beam size.

To correct for thermal lensing of the focusing optic integrated power-time information for that optic is utilized to determine a compensation value which is introduced in real time to lens driving system to correct and thereby maintain the intended position of the focal spot. In the illustrated embodiment the correction signal is added as an offset to the signal which drives the servo which controls the position of lens carrier 35 in cutting head 23. In other systems, such as those using adaptive optics, the shift signal can be used as an offset in the controller for the adaptive optic. In some cases, the shift signal can also be used as an offset for the Z-axis control of the cutting head.

When compensations are made for both the output coupler and the focal optic, the position of the focal spot relative to the workpiece is rendered substantially consistent regardless of the position of the cutting head, regardless of the operating power level, regardless of the steady state conditions of beam full on and off, and regardless of the intermediate conditions between those steady states.

Figure 9:
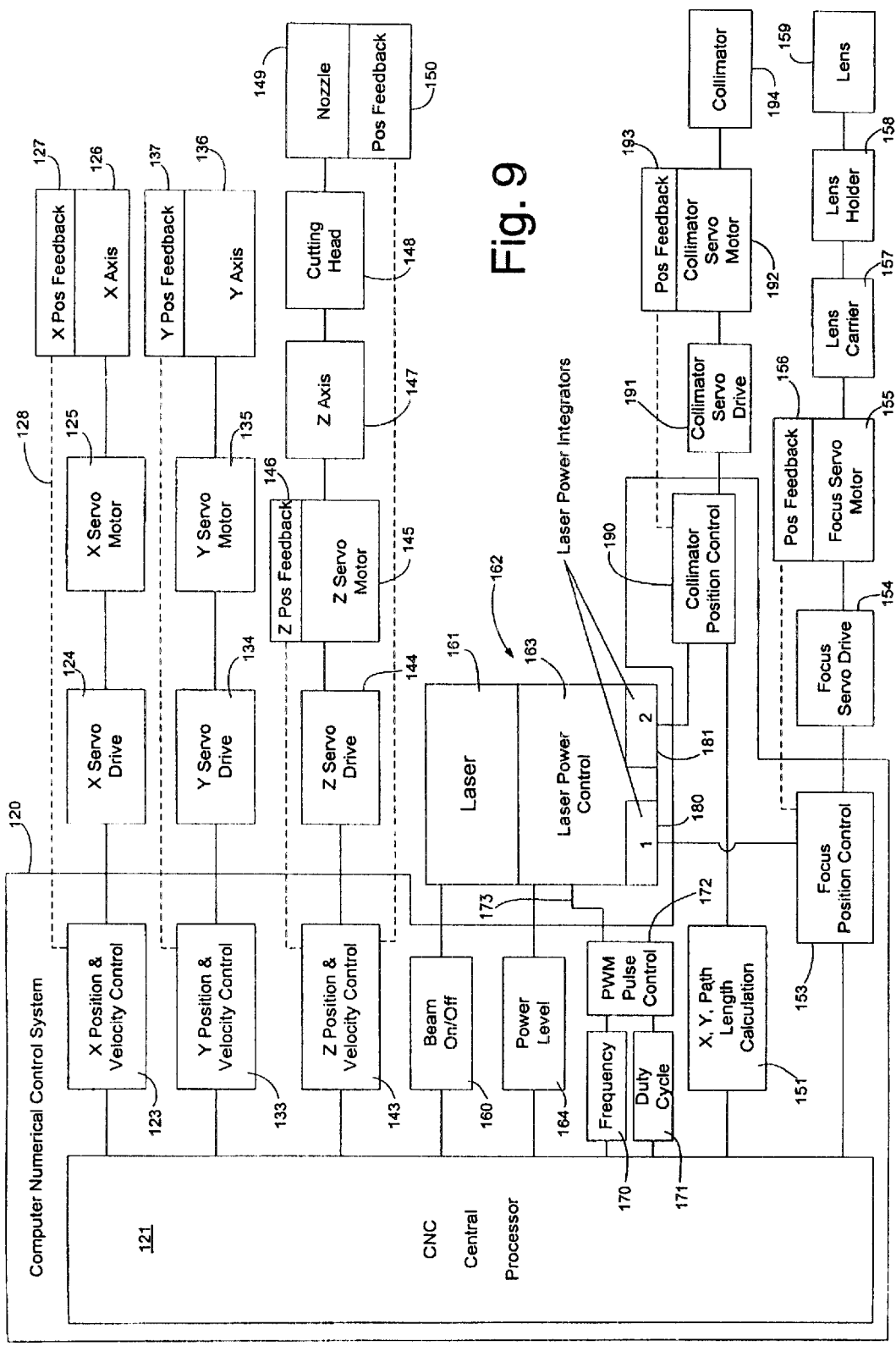
FIG. 9 is a block diagram illustrating a control system exemplifying the present invention.

Turning now to FIG. 9, there is shown a block diagram for a control system adapted to make the aforementioned corrections in accordance with the present invention. A computer numerical control system 120 is represented by the large block, with a number of functional blocks within it. The CNC central processor 121 is separately illustrated, although it will be appreciated by those skilled in the art that many of the functions separately illustrated within the block 120 are performed in whole or in part by the CNC central processor. They are shown separate in FIG. 9 as an aid in understanding the present invention.

The illustrated numerical control system is a four axis device, with conventional X, Y and Z axes and a fourth axis parallel to the Z-axis devoted to the position of the lens carrier. The invention can be applied with more or fewer axes. The CNC system 120 includes a position and velocity control module for each of the X, Y and Z axes. Thus, an X position and velocity control module 123 responds to signals from the central processor 121 to control an X-axis servo drive 124 which in turn controls the X-axis servo motor 125. The position of the bridge along the X-axis is represented by the box 126, and it is seen that a feedback position element 127 has an output 128 connected as a feedback input to the X position and velocity control module 123. Thus, the CNC is capable of driving the bridge along the X-axis to any coordinate and at any selected velocity in a conventional fashion.

A Y position and velocity control module 133 has associated elements including a Y-axis servo drive 134 and a Y-axis servo motor 135 which control the position of the cutting head along the Y-axis 136. Position feedback element 137 provides feedback to the Y position and velocity control module 133. The Z position and velocity control module 143 is similar to the X and Y modules in the present embodiment, in that is acts through a Z-axis servo drive 144 upon a Z-axis servo motor 145. In this case, however, the servo motor 145 has feedback element 146 associated directly with the motor, and that position feedback is coupled back to the feedback input of the Z position and velocity control module 143. The Z-axis position is represented by the block 147, and the block 148 indicates that it is the cutting head 148 which is positioned along the Z-axis, and more particularly the nozzle which is represented by the block 149. Additional position feedback 150 is provided from the nozzle and coupled back to the Z position and velocity control module 143. The cutting head can have, for example, position feedback dependent on the proximity to the workpiece which obviously can vary in thickness. Thus the position feedback element 146 can respond in absolute coordinates to the position of the drive, whereas the feedback position element 150 may respond in terms of the position of the nozzle 149 with respect to the workpiece.

In practice, whenever a cut is to be made, the CNC central processor 121 operates through the modules 123, 133, and 143 to position the cutting head with the nozzle above a selected point on the workpiece. Piercing is accomplished and then the nozzle is traversed across the workpiece in directions coordinated to the shape and size of the part to be cut, with the laser beam switched on and off during the traverse of the cutting head to cut the appropriate part.

In practicing the invention the numerical control system 120 includes a module 151 which operates in conjunction with the modules 123 and 133 to determine an X, Y path length calculation for purposes of compensating for the beam path length. Thus, the modules 123 and 133 have precise information on the position of the cutting head with respect to the workpiece, and thus have the information necessary to calculate the path length or deviations in the path length from a set or home position. The module 151 performs that computation to produce the path length correction which is one of the inputs to the three-dimensional correction of FIG. 8.

The CNC central processor 121 also has the capability of positioning the lens holder along the Z-axis. This is, in effect, a fourth numerically controlled axis, sometimes called the U-axis. A focus position control module 153 similar to the modules 123, 133, and 143, responds to commands from the central processor 121 to control the position of the lens carrier within the cutting head. An output signal from the module 153 is coupled to a focus servo drive 154 and which controls a focus servo motor 155. The servo motor 155 has a feedback module 156 associated therewith which couples a position feedback signal to the module 153. The servo motor 155 controls the vertical position of the lens carrier represented by the block 157 which carries the lens holder represented by the block 158 which in turn carries the lens represented by the block 159.

Thus, as so far described, the focus position control operates in a similar fashion to the Z position control module 143 to control the position of the lens within the cutting head. Operation of the focus position control 153 with the Z position maintained constant will tend to shift the focus point either toward or away the workpiece depending on the direction of controlled movement.

The CNC central processor 121 also controls certain aspects of the laser operation, including laser beam on/laser beam off, the power level at which the laser is commanded to operate, and in cases of pulse width modulated control of the laser, the frequency and duty cycle of the pulse width modulated output. Thus, the CNC central processor 121 is coupled to a beam on/off control module 160 which in turn is coupled to a laser control processor 161 in the laser control module generally indicated at 162. The laser processor 161 accepts signals from a numerical controller to take such actions as turning the beam on and off. The module 160 is adapted to send those signals to the computerized control 161 which then responds by controlling the on or off state of the beam. The control module 162 also includes a laser power control unit 163. The CNC processor 121 has associated therewith a power level control module 164 which is an interface to the laser power control processor 163. Thus, if a particular cut is to be made with the laser beam set at 3000 watts, for example, the processor 121 will output data to the power level control module 164 indicating that the laser power control 163 is to be instructed to operate the laser at the 3000 watt level. The module 164 thereupon sends a signal to the laser power control unit 163 which causes the processor within the module 163 to operate the laser with a 3 kW output.

For operating the laser beam under pulse width modulated control, the CNC processor 121 has interface elements including a frequency control module 170, a duty cycle control module 171, and a pulse width modulated pulse control 172 to set the frequency of the on and off periods and the duty cycle within that frequency at which the laser beam is to be operated. The frequency is set by way of interface module 170 and the duty cycle by way of interface module 171. Those signals are combined in the pulse width modulated pulse control interface element 172 to produce a duty cycle output signal on a line 173 which is coupled to the laser power control computer 163 for pulsing the laser on and off for a given duty cycle at a given frequency as demanded by the CNC central processor 121.

In practicing the invention, a pair of laser power integrators 180, 181 are provided for monitoring the energy stored within two different optical elements in the system. In the typical application, the modules 180 and 181 will have different time constants and different energy levels, and will be associated with particular optical elements in the system to monitor the stored energy condition of the those elements. Recalling FIG. 7, it will be seen that the integrators 180 and 181 are capable of monitoring the position along the curve relating time to stored energy. Thus, an output signal from the integrator will continuously indicate the energy stored within the associated optical element in real time.

In the illustrated embodiment, the integrator 181 is associated with the output coupler of the laser. It may have, for example, a time constant in the range of six to ten seconds and be capable of indicating the stored energy in the optic associated with the laser output power level. It is recalled that the curve of FIG. 7 is intended to illustrate the energy stored in the laser output coupler, and thus the integrator 181 monitors the on and off intervals of the laser during normal and PWM operation. The integrator 181 has stored therein a curve which represents the energy storage and energy release values and time constants for the associated optical elements and thereupon integrates positively to increase the stored energy level whenever the laser is on, (such as illustrated at 90 and 92 of FIG. 7), and integrates negatively to decrease the stored energy level, (such all illustrated at 91 of FIG. 7), whenever the laser is off. Thus, curves such as illustrated in FIG. 7 will be generated over time by the integrator 181 and will serve as a measure of the energy stored within the laser output coupler.

The integrator 180 is similar in construction but will typically have a different time constant associated therewith. In the preferred embodiment the integrator 180 is associated with the focus optic. As such it may have a time constant which is much nearer twenty seconds than the six seconds of the laser output coupler. However, it will have an exponential build-up and exponential decay, similar to the output coupler. Since focusing optics are typically indirectly cooled, the cooling curve may be somewhat shallower than the warming curve. However, those conditions will be determined by experiment for a particular set of hardware, to produce a particular set of parameters which generate a curve such as that illustrated in FIG. 7, but with values and constants defined by the physical response of the particular optic to incident laser energy at given power levels. It is also noted that typically a laser will have a shutter box which will be closed at times with the laser beam on. In those conditions, the output coupler will have energy incident thereon, but the focus optic will not, so the integrators will be operating under different conditions.

In practicing the preferred embodiment of the present invention, the path length determination made by module 151 is combined with the integrated energy information collected by integrator 181 to determine from a characteristic such as the aforementioned three-dimensional relationship, a position control correction to be introduced into the laser beam by way of the collimator 22. Thus, a collimator position control module 190 has a first input coupled to the energy integrator 181, and a second input coupled to the X, Y path length calculation module 151. The collimator position and control module 190 has data stored therein data corresponding to the three-dimensional relationship of FIG. 8 and produces an output representing a correction signal to be sent to the collimator. In the present embodiment that output is produced as an offset signal on a signal line coupled to the collimator servo drive 191. The drive 191 operates the collimator servo motor 192 which in turn positions the collimator 194 to adjust the divergence of the laser beam so as to maintain a beam size of the desired dimension at the focus optic. The collimator servo motor 192 has a position feedback element 193 associated therewith which returns a feedback signal to the collimator position control 190.

The focus optic integrator 180 has an output coupled as an input to the focus position control 153. It is recalled that the position control 153 operates on a primary signal from the CNC central processor 121 to control the position of the lens 159. An offset signal is provided by the integrator 180 which serves to modify the output signal of the focus position control in accordance with the energy stored in the focus optic. Thus, the output signal from the focus position control 153 is modified to take account of the distortion of the focus optic caused by the laser beam of particular power incident thereon for its actual on and off times. That offset adjusts the output signal of the focus position control so that the actual position of the lens 159 is adjusted in accordance not only with the machine position commands of the CNC central processor 121, but also to correct for distortion in the optics created by the laser beam passing through the focus optic at particular power levels for particular lengths of time.

In summary, the control system illustrated in FIG. 9 operates in a conventional fashion to traverse the cutting head over the workpiece and to control the power level and on and off condition of the laser beam to cut parts from the workpiece. In addition, the laser power control 163 has a pair of integrators associated therewith to integrate the stored energy in the two primary devices which will distort as a result of high power laser energy being incident thereon. In connection with the output coupler, the energy is integrated according to the power level set for the laser and the actual on and off intervals for the laser, and that signal is coupled along with a beam path length correction to operate through a three-dimensional correction curve to adjust the collimator so as to maintain a constant beam size at the focus optic for all positions of the cutting head and all possible states of distortion of the output coupler. Thus, as the CNC controller 121 operates the cutting head to move it across the workpiece to cut particular shapes, the path length calculation is continuously made by the module 151 and the collimator position control is continuously adjusted to maintain the desired spot size at the focus optic, all in real time. Similarly, as the laser is on for longer periods of time and tends to increasingly distort the output coupler until equilibrium is reached, a signal is produced by the integrator 181 to also adjust the collimator to take account of the distortion of the output coupler occasioned during the cut.

In addition, also in real time, a second integrator with a separate time constant maintains the integrated energy level of the focus optic and couples that signal through a focus position controller 153 to separately adjust the position of the lens with respect to the workpiece. Thus, for example, the first correction control system maintains a constant spot size or beam diameter on the focus optic, and the second control system which takes account of distortion in the focus optic adjusts the focus of that optic to maintain the spot size where the CNC central processor 121 commanded it to be.

Having described in detail the operational elements of the laser system, with particular emphasis on the beam delivery system and its control, attention will now be directed to certain aspects which provide adaptability of the high power laser plate cutting machine for both thick plate and lighter stock such as sheet metal.

Figure 11:
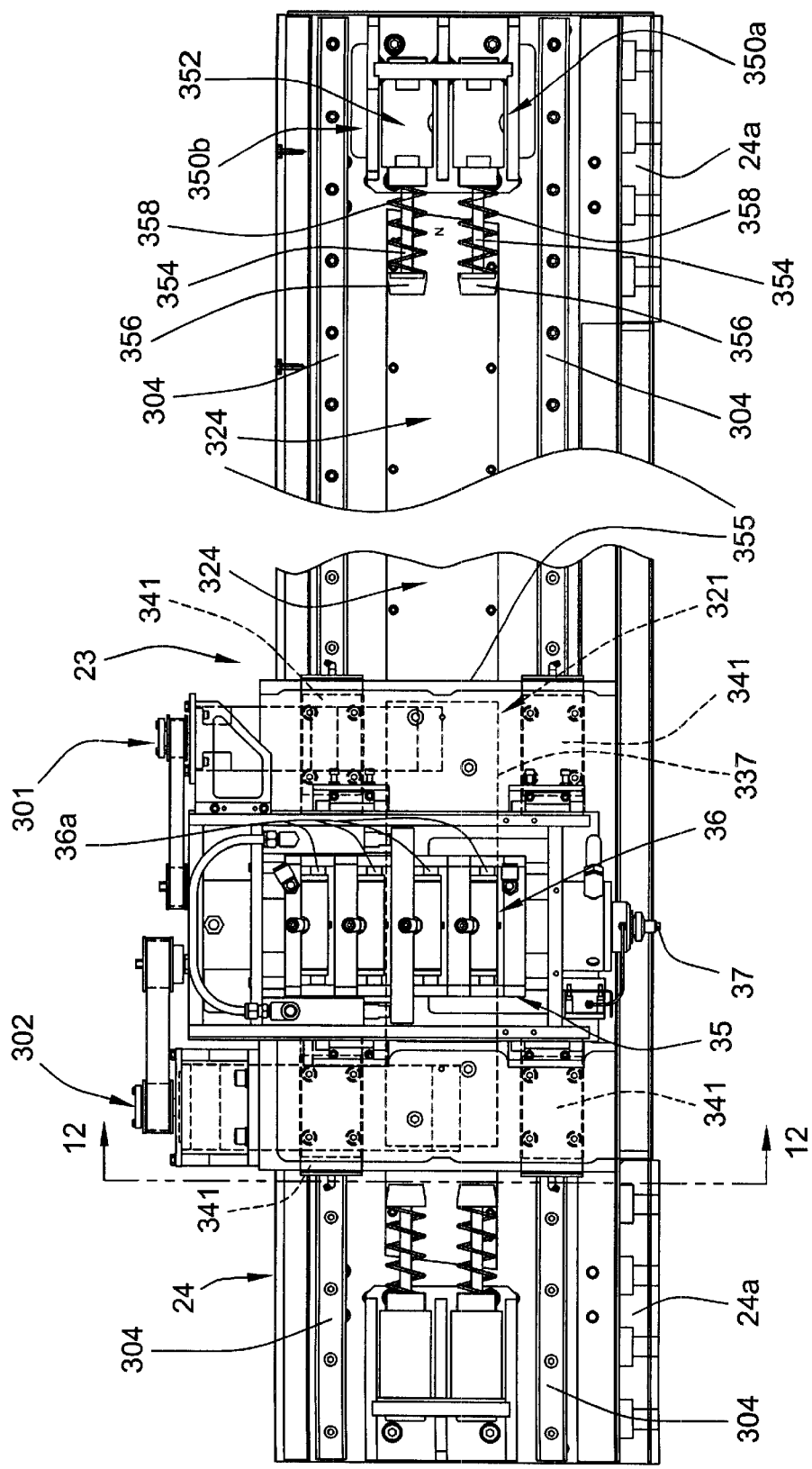
FIG. 11 is a front view of the bridge of the machine of FIG. 1.

In order to adapt the machine for cutting a wide range of material thickness, provision is made for changing the focal length of the focusing optic. As best seen in FIG. 11, cutting head 23 includes an optical housing 35 which carries a focusing optic (not shown). The focusing optic is mounted in a holder 36 which is mounted in a slot 36a in the optical housing or carrier 35. While a number of interchangeable lens configurations can be used, the illustrated embodiment employs the preferred implementation in which the carrier 35 provides a plurality of slots 36a (4 slots being shown in FIG. 11). Each slot is intended to hold an optical element of a different focal length. For example, one of the slots is dedicated to 10 inch focal length lenses. When the machine is desired to operate with that focal length optic, a lens holder, carrying a 10 inch focal lens, is inserted in the optical housing 35 in the slot 36a for 10 inch focal length optics. All of the other slots 36a will be filled with blank holders, which contain no lens, and simply serve to seal the beam path through the cutting head. When it is desired to change to a longer or shorter lens, the 10 inch focal length optic holder is removed and replaced with a blank holder, whereas a new lens holder, say for 12.5 inch focal length is put into the slot physically associated with that focal length.

The ability to change optics as described above is important in a versatile machine. It will be most efficient to use relatively long focal lengths (say 10 inch or more) for thick plate, because of the increased depth of focus and larger spot size they provide. However, with thinner materials, it is preferable to use shorter focal length lenses. The ability to install different focal length lenses in the cutting head without making other adjustments provides means to quickly change from longer focal length lenses for cutting heavy plate to shorter focal length lenses for lighter or thinner material.

In addition to the ability to change optics, the present invention also employs linear motors to adapt the machine for cutting a wide range of material thickness. As previously indicated, when cutting thinner materials the cutting speed of the machine can and should significantly increase relative to the cutting speed of thick plate. Linear motors provide for accurate positioning at high speeds for thin sheet, while for thick plate linear motors provide highly accurate positioning at lower speeds, as well as rapid acceleration, travel and deceleration when traversing between cuts. For example, the temperature of a thick plate workpiece in the area being cut can become unacceptably high due to the high power laser and relatively slow cutting speed. The linear motors permit fast and precise re-positioning of the cutting head to a second area for initiating a different cut, after which the cutting head can return to the first area to finish the initial cut. The high traverse velocities provided by the linear motors, preferably above 3000 ipm, makes such an operation feasible, increasing the productivity of the machine.

Referring briefly to FIG. 3 for orientation, the machine base includes a pair of machine legs 201, 202 which carry the machine bridge 24 for translation along ways generally indicated at 203, 204. The configuration of the machine base generally comprises a plurality of interlinked plates which form the supporting structure for the raised legs 201, 202 and slag collection bed 200. The structure of the base and bed will not be described in detail herein, but is described in applications Heavy-Duty Laser Plate Cutting Machine, Ser. No. 09/636,205, filed Aug. 10, 2000, and Ser. No. 09/302,278, filed Apr. 30, 1999, the disclosures of which are incorporated herein by reference. The legs 201, 202 have upper surfaces 207, 208 respectively which carry the ways 203, 204 which support and guide the machine bridge 24.

Figure 10:
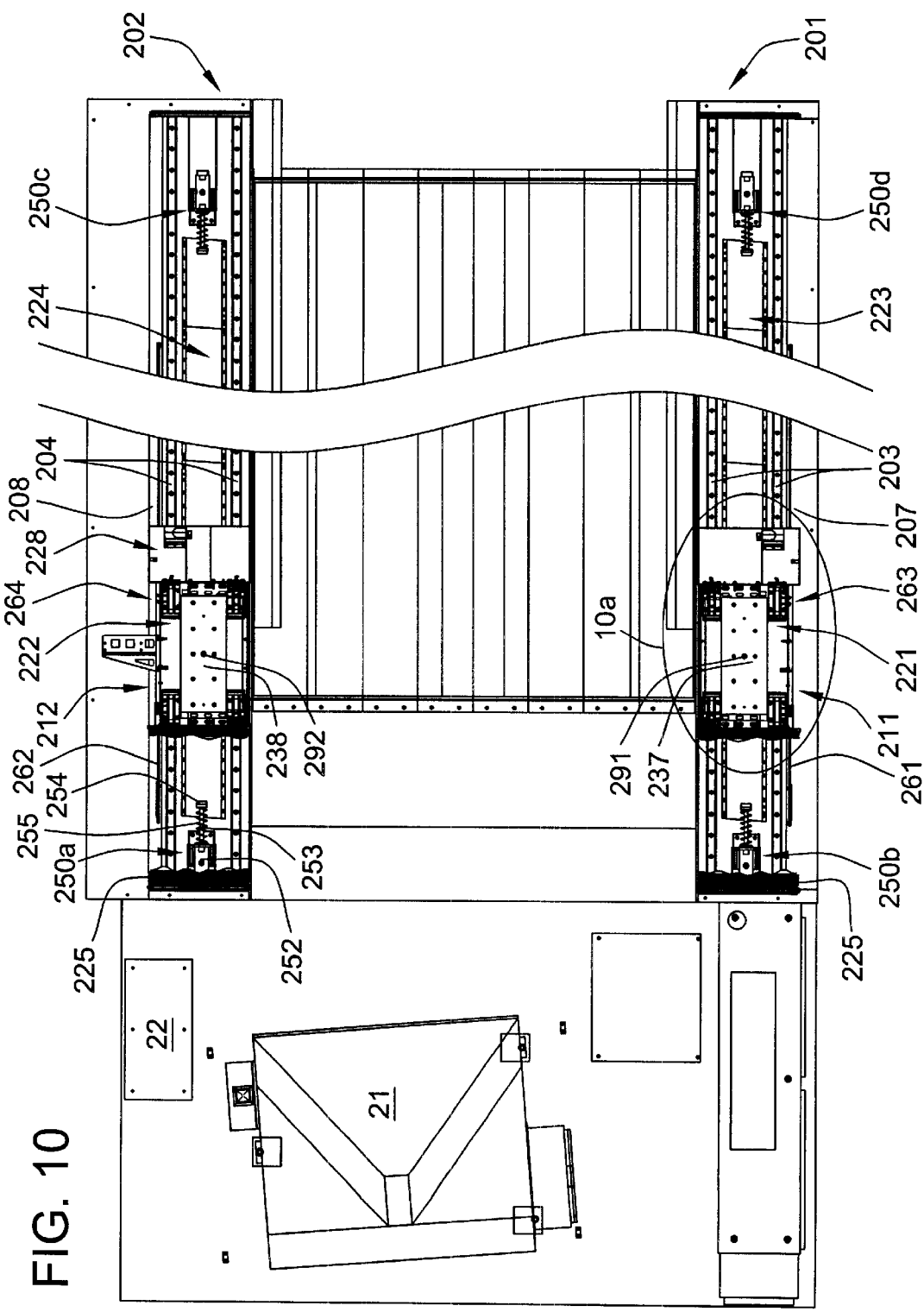
FIG. 10 is a plan view of the machine, partially cut-away to reveal the base, ways and trucks shown in FIG. 3.

FIG. 10 shows a plan view of the machine, partially cut-away to reveal the machine base, ways and trucks. The ways 203, 204 are supported on the upper surfaces 207, 208 of the legs 201, 202 respectively, which are separated by slag bed 200. Trucks 211, 212 are slidably mounted to the ways 203, 204, preferably utilizing linear ball slides or bearings 241 (FIG. 10 a) corresponding with the ways 203, 204. The trucks 211, 212 are adapted for translation along the X-axis, and support opposing ends of the bridge 24 (not shown) for translating the bridge along the X-axis. In practice, bellows 225 (shown cut away) attach to opposite ends of the trucks 211, 212 to cover and protect the portions of the legs 201, 202, ways 203, 204 and magnet track 223, 224 that would otherwise be exposed.

As described above with reference to FIG. 9, the CNC system 120 controls an X-axis servo motor 125 and a Y-axis servo motor 135. Position feedback elements 127 and 137 provide feedback of position and velocity in the X and Y directions respectively. In the embodiment illustrated in FIGS. 10–11, The X-axis servo motor 125 comprises two linear motors, indicated generally at 221 and 222, for driving the trucks 211, 212 and hence bridge 24 along ways 203, 204. The Y-axis servo motor 135 also comprises a linear motor 321 (FIG. 12) for driving the cutting head 23. These linear motors can translate the laser cutting head 23 at speeds corresponding to cutting heavy plate, as well as thinner plate such as sheet metal, in an extremely quick and precise manner.

Figure 10A:
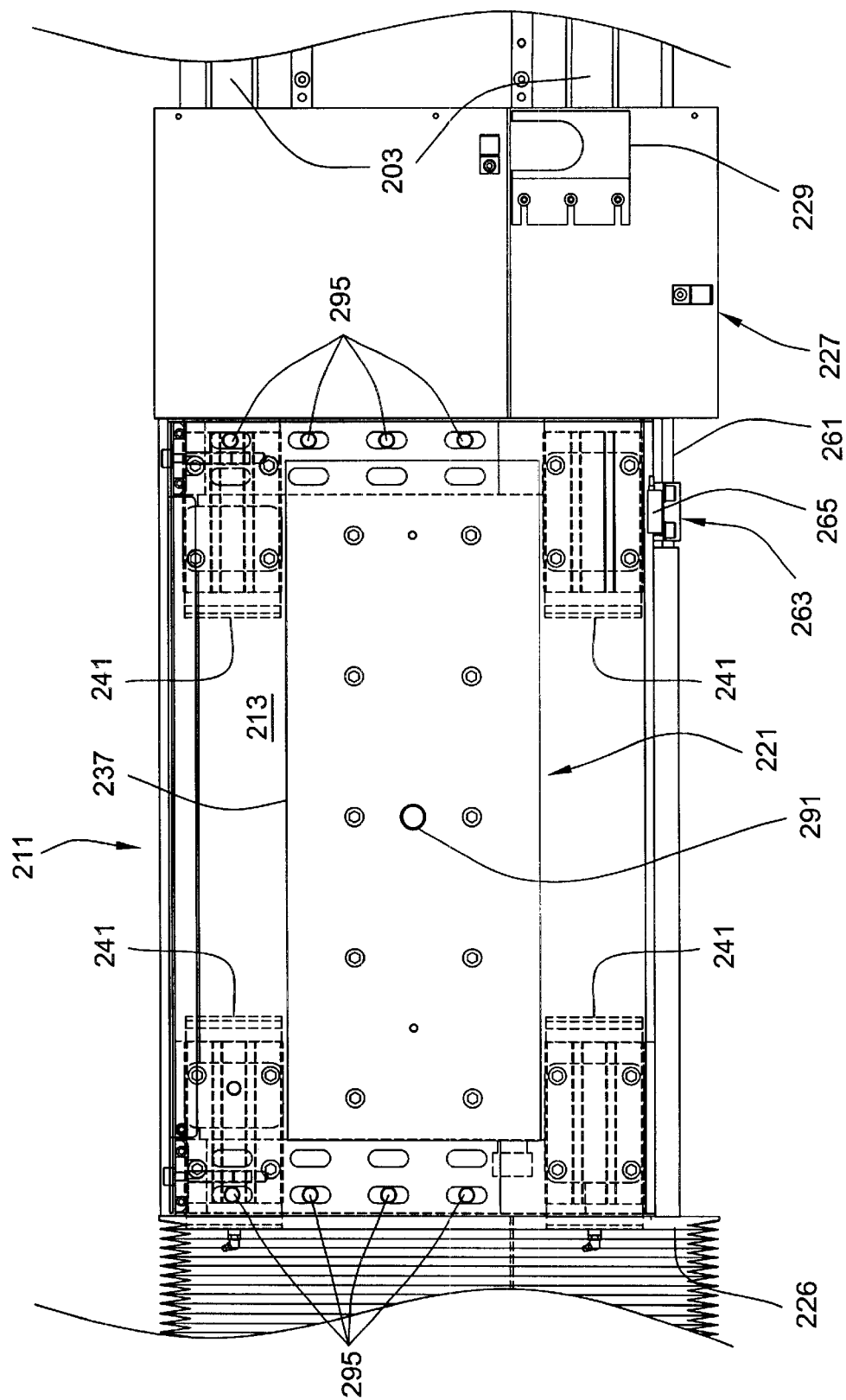
FIG. 10a is an enlarged view of circle 10a of FIG. 10.

As illustrated in FIG. 10, the position feedback element 127 comprises two position sensors, indicated generally at 263 and 264. By way of example, FIG. 10a illustrates position sensor 263, which includes read head 265 attached to the truck 211 at a position proximate optical strip 261 affixed to leg 201, for detecting position and velocity data. Similarly, position sensor 264 includes a read head and optical strip 262 for detecting position and velocity data. This feedback data is coordinated by the CNC system 120 for translation of the bridge 24 along the X-axis.

As shown in FIG. 10, the trucks 211, 212 are driven by linear motors 221, 222. The linear motors 221, 222 each include a powered coil assembly 237, 238 called a primary section that translates over corresponding magnet track 223, 224. The primary sections 237, 238 are attached to respective trucks 211, 212 so as to be coaxial with the magnet tracks 223, 224. The magnet tracks 223, 224 are affixed to the upper surfaces 207, 208 of the legs 201, 202 and preferably disposed between the ways 203, 204. The magnet tracks 223, 224 are comprised of a plurality of individual permanent magnets stacked end to end to form a continuous track and magnetic field. The primary sections 237, 238 are energized to repel the magnetic field of the magnet tracks 223, 224 to generate motive force to the trucks 211, 212, and hence the bridge 24.

Shock absorbers 250a, 250b, 250c, 250d are attached to the legs 201, 202 at each end of the ways 203, 204 to stop the traverse of the bridge 24 and protect the machine in the event the bridge exceeds the boundaries of the cutting area. Each of the shock absorbers 250a, 250b, 250c, 250d preferably comprise a hydraulic mechanism 252 operatively connected to shaft 253 projecting therefrom, the shaft having a rubber bumper 254 at its exposed end for engaging a runaway truck, and a return spring disposed between the hydraulics 252 and bumper 254 to return the shaft 253 to its extended and ready position.

Figure 10B:
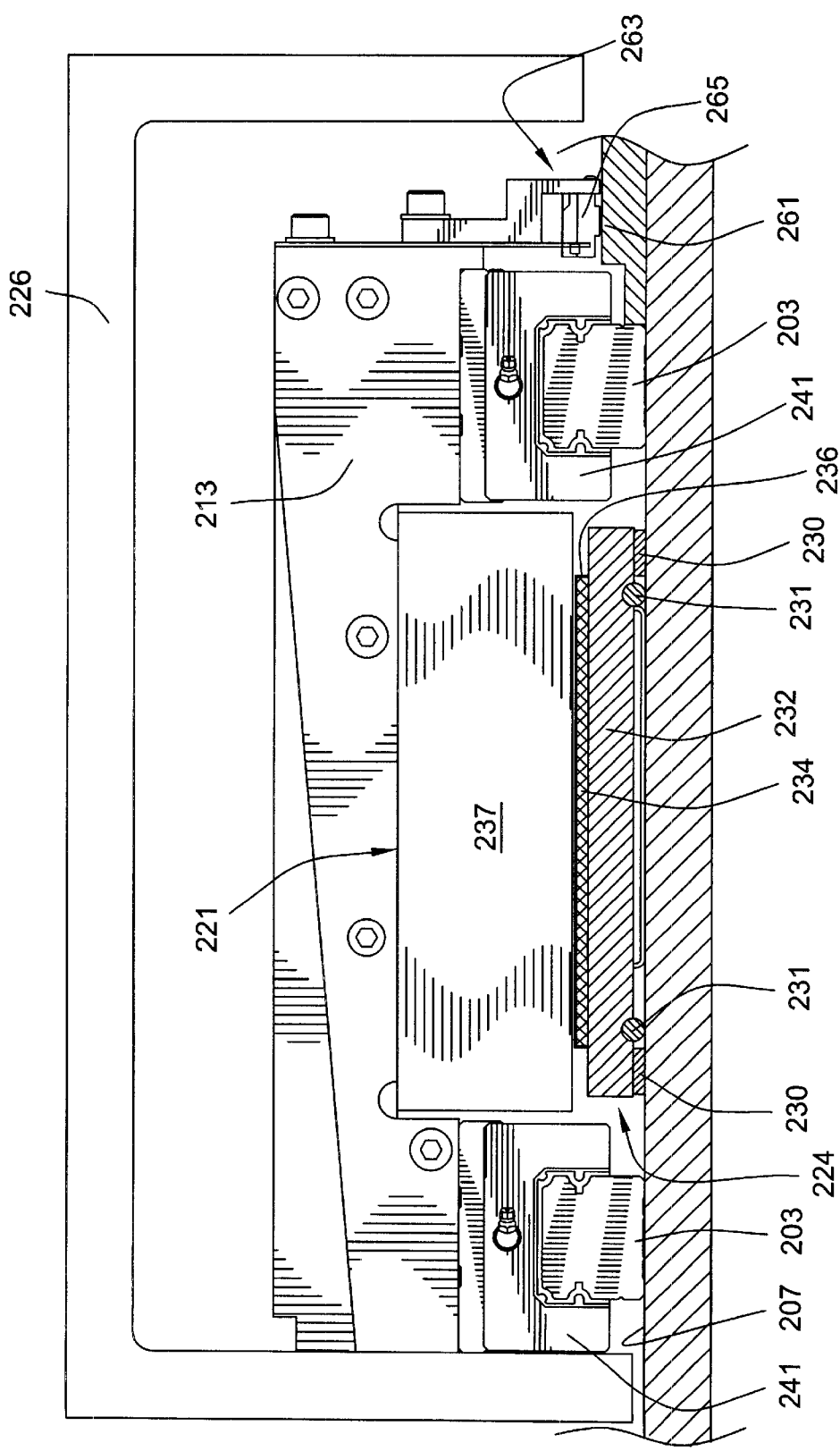

The trucks 211, 212 and linear motors 221, 222 are substantially the same, and will be described in more detail with reference to FIGS. 10a and 10b illustrating enlarged top and end views of truck 211 respectively. Truck 211 generally comprises four linear bearings 241 slidably engaging the ways 203. The bearings 241 support a truck body 213 for translation along the ways 203. The underside of the truck body 213 is structured to receive the primary section 237, which is preferably bolted to the truck body 213. The truck body 213 also includes a series of tapped apertures 295 at each longitudinal end for attaching an end of the bridge bottom base structure 24a (FIG. 13) of the bridge 24 to the truck 211. An aperture 291 is also provided in the truck body 213 for tightly receiving a dowel pin (not shown) to connect the truck 211 and bridge bottom base structure 24a. In this way, each end of the bridge 24 is supported by a truck 211, 212 for translation along the X-axis. It is also of mention that the truck 211 has attached thereto a conduit structure 227 having a clamp 229 for collecting the tubes, wires, etc. from the linear motor, position sensor, etc. for protection and easily translation with the truck 211. A flange 226 is connected to an end of truck 211 for attachment of bellows 225.

Turning to the end view of FIG. 10b (having an end plate removed for clarity), it can clearly be seen that the truck body 213 is supported by bearings 241 for linear translation along the ways 203. The primary section 237 of the linear motor 221 is attached to the underside of the truck body 213 and disposed proximate the magnet track 224. The distance between the coil assembly 237 and track 224 is kept very small, precisely sized to ensure high motive power and efficiency for fast translation along the ways, as is well known in the art.

The magnet track 224 can more clearly be seen in FIG. 10b, wherein the magnet track 224 comprises a mounting plate 232 supported on the upper surface 207 of the leg 201 by a pair of non-compressible strips 230 that serve as insulators to keep heat away from the mountings surfaces 207, 208. Space is provided for cooling tubes 231 which may be provided if so desired to draw heat from the magnet track 224. The plurality of aligned magnets, one of which is shown at 234, are attached to the mounting plate, preferably by an adhesive or glue. A protective cover 236 encloses the magnets and is affixed thereto, also preferably by glue. The protective cover is of a non-ferromagnetic material, which is stainless steel in the preferred embodiment. The mounting plate 232, including the magnets 234 and cover 236 are attached to the leg 201, preferably via bolts as shown in FIGS. 10 and 10a.

FIG. 10b also shows the position sensor 263 which detects position and velocity data regarding the movement of truck 211. The position sensor 263 comprises a read head 265 which determines position and velocity and which is attached to an outer side of the truck body 213 and disposed adjacent the upper surface 207 of leg 201. An optical strip is attached to the leg 201 for use with read head 265. Such position sensors are well known in the art, and as also well known, there are numerous other position sensors or linear encoders also well suited for use with the present invention to provide feedback to the CNC system 120.

By virtue of position sensors 263, 264, linear motors 221, 222 and the CNC system 120, the bridge 24 is capable of traversing the ways 203, 204 at speeds suitable for cutting both heavy plate as well as thinner material. The linear motors 221, 222 provide a rapid and smooth movement of the bridge 24 by virtue of their direct drive from the magnet tracks 223, 224 to linear motors 221, 222 directly affixed to the trucks 211, 212. As the drive force and the position sensing are near the load, the use of linear motors eliminates backlash and provides high cutting speed and accuracy for cutting thin material at high speeds or thick material (heavy plate) at slow speeds. The linear motors themselves have no moving or sliding parts and therefore are very low maintenance items and are capable of very high traverse velocities, such as 6000 ipm. The CNC system 120 is capable of utilizing data from the sensing elements 127, 137 to accurately control the linear motors 221, 222 for traversing the bridge at cutting speeds suitable for both heavy plate and thinner sheet material.

The same benefits of utilizing linear motors to traverse the bridge 24 along the X axis also applies to traversing the cutting head 23 along the Y axis. Turning attention to FIG. 11 depicting a front view of the bridge 24, much like the structure for providing translation in the X direction, the bridge 24 includes a pair of ways 304 for directing the translation of the cutting head 23 along the Y-axis. The ways 304 span the breadth of the bridge 24, a portion of which has been cut away in FIG. 11. The vertical position of the cutting head 23 (Z-axis) and the vertical position of the lens holder 35 (U-axis) are controlled by conventional rotary servo motors 302 and 301.

The cutting head 23 includes four linear bearings or slides 341 (shown in hidden) bolted to a rear surface of the cutting head 23 for translation along the ways 304 in the Y direction. Each end of the bridge 24 also includes two shock absorbers 350a, 350b for stopping the translation of the cutting head 23 in the event it excessively exceeds the boundaries of the cutting area. Each shock absorber 350a, 350b includes a hydraulic mechanism 352 having a shaft 354 projecting therefrom. The exposed end of the shafts 354 include cushioning bumpers 356 for engaging the cutting head 23, while springs 358 are positioned between the hydraulic mechanism 352 and bumpers 356 for returning the shafts 354 to their extended positions after absorbing a load. A linear motor 321 is used to translate the cutting head 23 along the Y-axis, the linear motor 321 generally comprising a magnet track 324 and a primary section 337 (shown in hidden in FIG. 11 and best seen in FIG. 12) attached to the rear of the cutting head supporting truck 355 for cooperation with the magnet track 324. The magnet track 324 comprises a series of permanent magnet sections stacked end to end along the Y-axis to generate a magnetic field for repulsion by the primary section 337. The bridge 24 includes a bottom base structure 24a for attachment of the bridge 24 to the trucks 221, 222.

Figure 12:
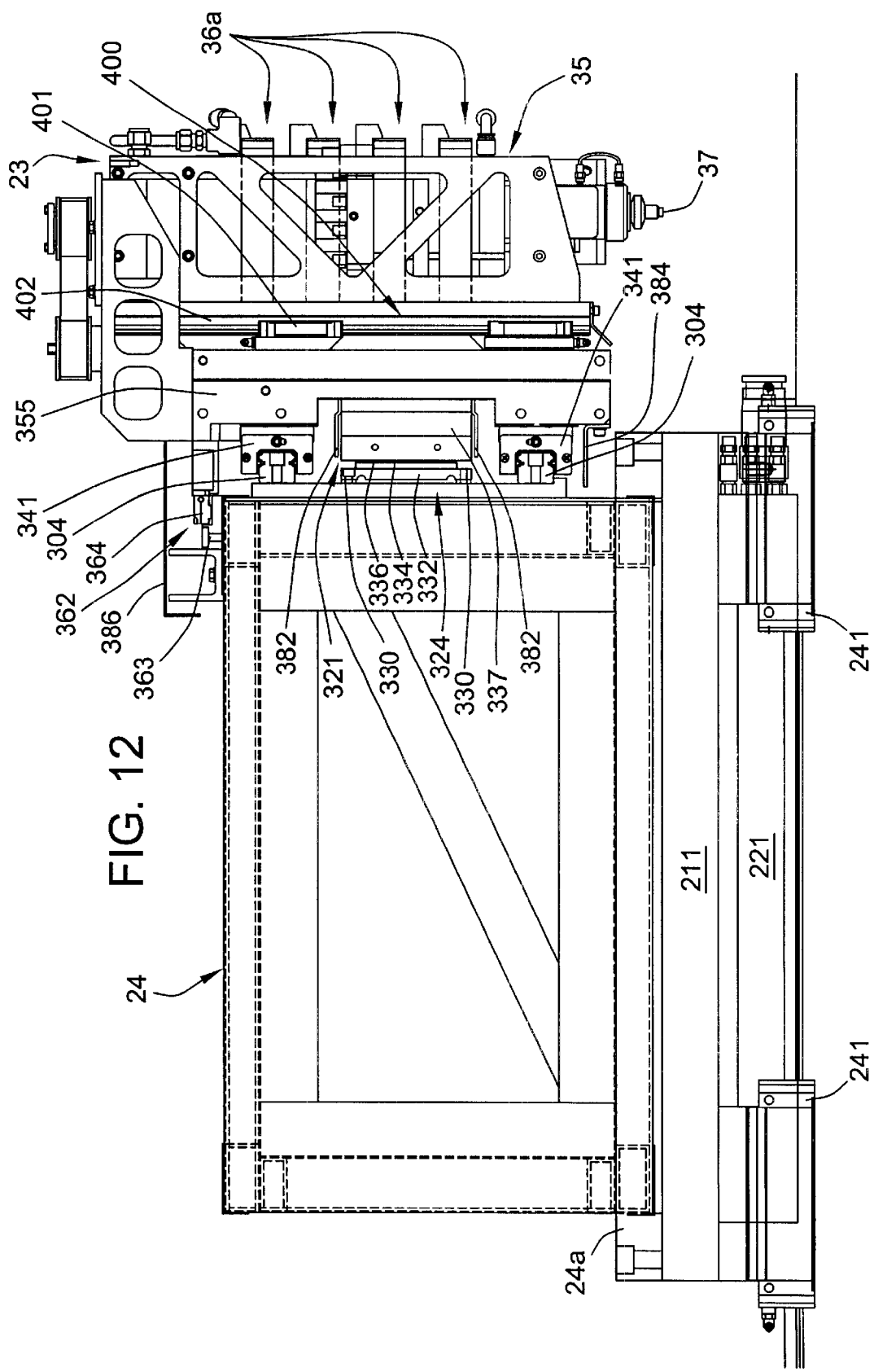
FIG. 12 is a cross-sectional view taken about line 12—12 in FIG. 11.

Turning to FIG. 12, a cross-sectional view of the bridge 24 and the cutting head 23 is depicted. The bridge 24 is constructed of a plurality of tubular members forming a frame including a honeycomb construction to provide a low-weight bridge that permits high acceleration and deceleration, high cutting and traverse speeds, yet also can sustain the forces imposed by linear motor 321. The bridge includes a base member 24a bolted to the trucks 211, 212 for translation in the X direction. Focusing attention to the cutting head 23, the cutting head 23 is slidably attached to the bridge 24 by way of bearings 341 attached to a rear surface of the cutting head supporting truck 355. The cutting head supporting truck 355 is disposed to engage the ways 304 for translation of the cutting head 23 along the Y-axis. The ways 304 are bolted to a forward facing surface of the bridge 24 to guide the cutting head 23. The rear surface of the cutting head supporting truck 355 also includes flange 386 attached to an upper end thereof and flange 384 attached to a lower end for protecting the linear ways 304 from dust and debris.

The rear surface of the cutting head supporting truck 355 is also structured to receive the primary section 337 of linear motor 321. The primary section 337 is preferably bolted to the cutting head supporting truck 355, wherein flanges 382 are disposed proximate the primary section 337 on opposing sides to promote circulation of air and cooling. The primary section 337 is disposed coaxial with and very close to the magnet track 324. Briefly, the magnet track 324 includes a mounting plate 332 bolted to the bridge 24 and spaced slightly away therefrom by non-compressible insulating spacers 330 which keep heat away from the bridge 24. The plurality of magnets, one of which is shown at 334 are attached to the mounting plate 332, preferably by adhesive, to produce a magnetic field for repulsion by coil assembly 337. The series of magnets 334 are covered and protected by shield or cover 336 which is made of a non-ferromagnetic material, stainless steel in the preferred embodiment. The magnet track 234 and coil assembly 337 are disposed in close proximity to one another to provide a powerful direct drive to the cutting head 23 for rapid, and smooth translation along the Y-axis.

The bridge 24 also includes an optical track 363 mounted to an upper surface thereof. The Y-axis feedback element 137 generally comprises a position sensor indicated generally at 362. The cutting head includes a C channel attached to a rear surface thereof to dispose a read head 364 proximate the optical strip 363 for detecting position and velocity data for the cutting head 23. The CNC system 120 utilizes the feedback from position sensor 362 to accurately control the translation and position of cutting head 23 at speeds suitable for cutting both thick and thin material.

Cutting head 23 is mounted to the front face of supporting truck 355 via linear guides or ways 400 (FIG. 12) which allow the cutting head 23 to be selectively positioned in the vertical or Z axis direction. Linear bearings 401 are bolted to the front face of supporting truck 355 and the ways 402 are bolted to the back face of cutting head 23.

Turning attention to FIG. 13, the base 24a of the bridge 24 is shown in top elevation. The bridge bottom base structure 24a includes two opposing ends 396, 397 configured for attachment to the trucks 211, 212 as shown in FIGS. 3 and 12. The ends 395, 396 each have on opposing sides a plurality of counter sunk apertures 395 that cooperate with the apertures 295 and the trucks 211, 212 for bolting the bridge base 24a to the trucks. The bridge bottom base structure 24a includes at each end 396, 397 an aperture 390, 391 respectively for receiving the dowel pins (not shown) which are sized to tightly fit within the apertures 290, 291 in the respective trucks. These apertures and dowel pins are used to initially position the bridge 24 on the trucks and connect the truck 211, 212 to the bridge 24 such as to allow bridge 24 to be squared with the X axis. The dowel pins are an interference fit with the needle bearings providing a preloaded pivotal connection. The combination of a preloaded pinned connection at base end 396 of bridge 24 and a slideable preloaded pinned connection at base end 397 makes it easier to square bridge during machine assembly.

Aperture 390 and base end 396 includes a needle bearing 398 (shown in FIG. 13A) which allows for the bridge 24 to rotate relative to the truck on which it rests. Thus, the trucks 211, 212 may be positioned to square the X axis without twisting or deflecting the bridge 24 and bridge bottom base structure 24a.

Similarly, the hole 391 at the end 397 of base 24a is provided with a needle bearing 399. The aperture 391 actually is formed in a small plate 394 which is slidably disposed in a slot 392. When a truck is moved during squaring, the length between the apertures 290, 291 in the trucks increases or decreases. Thus the aperture 391 formed in plate 394 is allowed to slide in the Y direction to increase or decrease the distance between holes 390, 391. With this structure, the bridge 24 is connected to the trucks 211, 212 via dowel pins connecting apertures 290, 291 and apertures 390, 391. Bridge 24 is set in place on the trucks 211 and 212, then adjusted and squared. Then the bridge base 24a is rigidly affixed to the trucks via bolts extending through apertures 395 and 295 in the bridge bottom base structure and trucks respectively, without stressing the bridge and without extra structure allowing angular twisting of the bridge as compared to Graf et al. U. S. Pat. No. 5,854,460.

Figure 14:
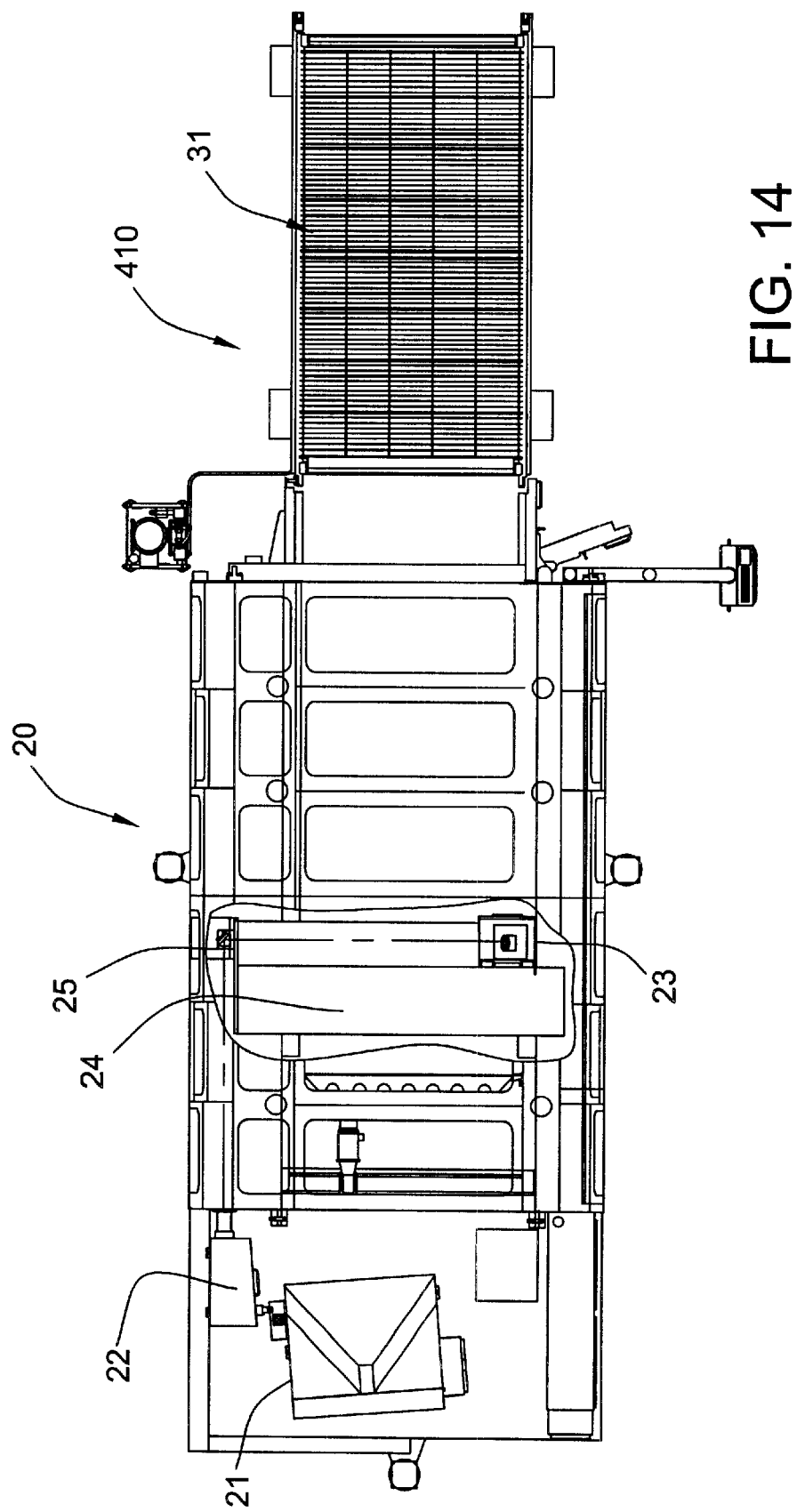
FIG. 14 is a plan view of the machine of FIG. 2 having a material load/unload station.

FIG. 14 is a plan view of the machine 20 having a load/unload station 410. A workpiece is loaded on a pallet 31 removably positioned at the load station 410. The pallet is slidably disposed so that it can be drawn directly into the machine 20 for processing the workpiece. After processing, the pallet 31 is returned to the load station 410 for unloading. The pallet is readily accessible for manual loading and unloading and is easily adaptable for automated material handling systems. This adaptability is due in part to direct loading and unloading, i.e. the workpieces need not be worked around machine structure for placement within the machine for processing.

It will now be appreciated that what has been provided is a laser-equipped machine tool configured to cut heavy plate at production speeds. A high power laser, preferably 3 to 4 kilowatts or more, and most preferably at least 6 kilowatts, provides the cutting power. A beam delivery system couples the beam from the laser to the focal optic in the cutting head. The beam delivery system has an adjustment mechanism to compensate for distortion in the output coupler caused by the high power laser beam. Preferably the mechanism is automatically adjusted by the CNC so that the beam size is precisely maintained in the presence of transient distortions in the optics. The cutting head which delivers the cutting beam and assist gas stream to the workpiece is adjustable by the CNC along x, y and z axes, so as to control machine motion to make the programmed cuts. The cutting head also has the ability to adjust the position of the focal spot with respect to the plate, a feature which is significant in the cutting of heavy plate.

These features which combine to provide the ability to cut heavy plate at production speeds can also afford significant utility when the machine is used for thinner sheet materials. The cutting head is preferably provided with the ability to exchange optics such that a relatively long focal length lens can be used with thicker materials, but shorter focal length lens can be substituted for cutting thinner materials. When cutting thinner material, the cutting speed significantly increases. The x and y axes include linear motors to precisely traverse the bridge and cutting head along the axes at speeds suitable for heavy plate, and at higher speeds suitable for thinner plate. The flying optic configuration and a comparatively light weight bridge structure allow high rates of acceleration and deceleration, high cutting speeds and very rapid traverse speeds. The result is a machine configured to cut heavy plate, but which can, if desired, also operate on lighter sheet metal at commercial production rates.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A heavy-duty laser plate cutting machine comprising in combination:

a laser source producing a laser beam having an output power of at least 3 kilowatts;

a cutting head carrying a focusing optic which focuses the laser beam to a focal spot and directs the focal spot toward a workpiece for cutting the workpiece, the cutting head having a drive for adjusting the focusing optic to position the laser beam focal spot relative to the workpiece during cutting;

an automatic beam control system interposed between the laser source and the focusing optic for assisting the cutting head to focus the laser beam; and a drive system configured to controllably position the cutting head over the workpiece along two orthogonal axes, linear motors defining each of the axes and configured to precisely and rapidly drive the cutting head along a path determined by the drive system at speed of less than 100 ipm during cutting of plate and at speeds in excess of 3000 ipm during traverse between cuts.

2. The combination of claim 1, wherein the cutting head is configured to carry a first focusing optic having a focal length selected for cutting sheet and a second focusing optic having a longer focal length for cutting plate.

3. The combination of claim 2 wherein the cutting head has a computer numerically controlled adjustable axis normal to the workpiece to controllably position a cutting nozzle in the cutting head with respect to the workpiece.

4. The combination of claim 3 further comprising a lens carrier in the cutting head having a drive for adjustment of the lens carrier within the cutting head normal to the workpiece, the computer numerical control being connected to the lens carrier drive for independently altering the position of the focus spot with respect to the workpiece without adjusting the position of the cutting head.

5. The combination of claim 4 wherein the computer numerical control is configured to adjust the lens carrier to compensate for thermal lensing of the focusing optic.

6. The combination of claim 2 wherein the focusing optic in the cutting head is removable and replaceable, the cutting head having a plurality of slots for receiving interchangeable focusing optics and positioning each of said interchangeable focusing optics within the cutting head at focal lengths corresponding to the respective interchangeable focusing optics.

7. The combination of claim 1 further comprising a bridge traversable along the first orthogonal axis and carrying the cutting head which is traversable along the second orthogonal axis, the bridge supported at opposing ends by a pair of trucks slidably disposed on a machine base.

8. The combination of claim 7 wherein the linear motors each include a primary section and a magnet track section, the primary sections adapted for translation along the magnet track sections, each of the trucks and cutting head having a primary section mounted thereto for translation along the two orthogonal axes.

9. The combination of claim 7 wherein the opposing ends of the bridge are rotatably supported by the trucks for individual adjustment of each truck relative to the machine base.

10. The combination of claim 9 wherein one end of the bridge includes a slot having a plate slidably disposed within the slot, the plate rotatably connected to the corresponding truck and configured to slide within the slot as the trucks are adjusted.

11. The combination of claim 1 wherein the drive system includes a position and velocity control module for each of the axes, the drive system being controlled by computer numerical control, the linear motors being controlled by corresponding position and velocity control modules.

12. The combination of claim 1 wherein the automatic beam control system comprises an adjustable collimator driven by a computer numerical control.

13. The combination of claim 12 wherein the computer numerical control is configured to adjust the collimator to compensate for thermal lensing.

14. The combination of claim 1 wherein the laser source produces a laser beam having an output power of at least 4 kilowatts.

15. A heavy-duty laser plate cutting machine comprising in combination:

a laser source producing a laser beam having an output power of at least 3 kilowatts;

a bridge traversable along a first orthogonal axis and carrying a cutting head which is traversable along a second orthogonal axis, the bridge supported at opposing ends by a pair of trucks slidably disposed relative to the machine;

the cutting head carrying a focusing optic which focuses the laser beam to a focal spot and directs the focal spot toward a workpiece for cutting the workpiece, the cutting head configured to carry focusing optics having different focal lengths, the cutting head having a drive for adjusting the focusing optic to position the laser beam focal spot relative to the workpiece during cutting;

a drive system for controlling relative motion between the cutting head and the workpiece;

an automatic beam control system interposed between the laser source and the focusing optic for assisting the cutting head to focus the laser beam; and a pair of linear motors driving the trucks to position the bridge along the first orthogonal axis, a linear motor positioning the cutting head along the second orthogonal axis; and each of the opposing bridge ends being rotatably supported by the trucks for independent adjustment and alignment of each truck relative to the first orthogonal axis.

16. The combination of claim 15, wherein each bridge end is releasably and rigidly connected to its respective truck.

17. The combination of claim 15, wherein each bridge end is linked to its respective truck by at least one of two connections, including:

a rotatable connection wherein the bridge is rotatable relative to the truck; and a rigid connection wherein the bridge is not rotatable relative to the truck.

18. The combination of claim 15, wherein a first bridge end is rotatably supported on the respective truck and configured to slide relative to the truck along the second orthogonal axis.

19. The combination of claim 18, wherein the first bridge end includes a slot having a plate slidably disposed in the slot along the second orthogonal axis, the respective truck rotatably connected to the plate.

* * * * *